US011202959B2

(12) United States Patent
Hayashi et al.

(10) Patent No.: US 11,202,959 B2
(45) Date of Patent: Dec. 21, 2021

(54) SYSTEMS AND METHODS OF DISPLAYING OR ARRANGING PRESENTED GAME CONTENT BASED ON A COMBINATION CONDITION WITH A SELECTED GAME OR STAGE

(71) Applicant: NINTENDO CO., LTD., Kyoto (JP)

(72) Inventors: Yugo Hayashi, Kyoto (JP); Shinya Fujiwara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 10 days.

(21) Appl. No.: 16/747,959

(22) Filed: Jan. 21, 2020

(65) Prior Publication Data
US 2020/0230496 A1 Jul. 23, 2020

(30) Foreign Application Priority Data

Jan. 22, 2019 (JP) .............................. JP2019-008502

(51) Int. Cl.
*A63F 13/2145* (2014.01)
*A63F 13/30* (2014.01)
*A63F 13/533* (2014.01)
*A63F 13/42* (2014.01)
*A63F 13/92* (2014.01)
*A63F 13/69* (2014.01)

(52) U.S. Cl.
CPC .......... *A63F 13/2145* (2014.09); *A63F 13/30* (2014.09); *A63F 13/42* (2014.09); *A63F 13/533* (2014.09); *A63F 13/69* (2014.09); *A63F 13/92* (2014.09); *A63F 2300/204* (2013.01)

(58) Field of Classification Search
CPC ......... A63F 13/30; A63F 13/69; A63F 13/533
See application file for complete search history.

(56) References Cited

U.S. PATENT DOCUMENTS

| 8,926,428 | B1 * | 1/2015 | Nakayama | A63F 13/822 463/31 |
| 10,540,797 | B1 * | 1/2020 | Goslin | A63F 13/67 |
| 10,905,960 | B2 * | 2/2021 | Yoneyama | G06F 3/04817 |
| 2009/0201298 | A1 * | 8/2009 | Jung | G06T 13/00 345/473 |
| 2009/0318234 | A1 * | 12/2009 | Christensen | A63F 13/533 463/42 |

(Continued)

OTHER PUBLICATIONS

"Dengeki Online [Mario Kart 8] Getting an Early Peek at the first Additional Content! Roundup of Character, Machine and Course Information", [online], Kadokawa Corporation, searched on Dec. 7, 2018, internet (URL: http://dengekionline.com/elem/000/000/957/957149/), one (1) page.

*Primary Examiner* — Chase E Leichliter
(74) *Attorney, Agent, or Firm* — Nixon & Vanderhye P.C.

(57) ABSTRACT

In order to select a content to be used in a specified game or game stage from a plurality of contents, a selection image including a plurality of contents is displayed in which possessed contents and unpossessed contents not possessed by a user are visually distinguishable, and at least a display form or display position of each content is varied based on parameters set for a combination of the content and the specified game or game stage, and at least one is selected from the plurality of contents displayed in the selection image.

21 Claims, 16 Drawing Sheets

(56) References Cited

U.S. PATENT DOCUMENTS

| | | | |
|---|---|---|---|
| 2010/0045697 A1* | 2/2010 | Reville | A63F 13/55 345/619 |
| 2010/0167815 A1* | 7/2010 | Gagner | G07F 17/3248 463/25 |
| 2011/0306410 A1* | 12/2011 | Tsugihashi | A63F 13/12 463/30 |
| 2013/0196732 A1* | 8/2013 | Oochi | A63F 13/69 463/17 |
| 2014/0004947 A1* | 1/2014 | Yamaguchi | A63F 13/00 463/31 |
| 2016/0364178 A1* | 12/2016 | Izuno | A63F 13/00 |
| 2018/0114398 A1* | 4/2018 | Cho | A63F 13/2145 |
| 2018/0169525 A1* | 6/2018 | Onishi | A63F 13/537 |
| 2018/0221768 A1* | 8/2018 | Otomo | A63F 13/79 |
| 2019/0030430 A1* | 1/2019 | Uto | A63F 13/58 |
| 2019/0035226 A1* | 1/2019 | Sato | G07F 17/3262 |
| 2020/0108319 A1* | 4/2020 | Sakurai | A63F 13/42 |
| 2020/0230496 A1* | 7/2020 | Hayashi | A63F 13/30 |
| 2021/0038993 A1* | 2/2021 | Nakahara | A63F 13/53 |

* cited by examiner

SYSTEMS AND METHODS OF DISPLAYING OR ARRANGING PRESENTED GAME CONTENT BASED ON A COMBINATION CONDITION WITH A SELECTED GAME OR STAGE

CROSS REFERENCE TO RELATED APPLICATIONS

The disclosure of Japanese Patent Application No. 2019-008502, filed Jan. 22, 2019, is incorporated herein by reference.

FIELD

The technology disclosed herein relates to information processing systems, storage media storing information processing programs, information processing apparatuses, and information processing methods, and more particularly to, for example, an information processing system, storage medium storing an information processing program, information processing apparatus, and information processing method for performing a process using a content selected by a user.

BACKGROUND AND SUMMARY

In some conventional racing games in which a character (e.g., a character sitting on and driving a racing car) controlled according to a user's input participate, a character selection image displaying a plurality of characters which can participate in the racing game is displayed in order to prompt the user to select a character which is to participate in the racing game.

However, there is room for improvement in enhancement of a motivation for obtaining a character not possessed by the user in the above character selection image.

With the above in mind, it is an object of this non-limiting example to provide an information processing system, storage medium storing an information processing program, information processing apparatus, and information processing method capable of enhancing a motivation for obtaining a content that can be used in a game and is not possessed by the user.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

An information processing system according to this non-limiting example includes a computer that executes: storing a content possessed by a user, as a possessed content, of contents usable in an application; specifying at least one of a plurality of games or a plurality of game stages included in the application; displaying, on a display screen, a selection image for selecting a content to be used in the specified game or game stage from a plurality of contents, the selection image including the plurality of contents; storing parameters set for a combination of each of the plurality of contents and each of the plurality of games or game stages; selecting at least one from the plurality of contents included in the selection image; and executing a game process for the specified game or game stage using the selected content and the parameters set for a combination of the selected content and the specified game or game stage. In the selection image, the plurality of contents are each displayed so that the possessed content and an unpossessed content not possessed by the user are visually distinguishable, and at least one of a display form or a display position is varied based on the parameters set for the combination with the specified game or game stage.

With the above configuration, not only objects possessed by the user but also unpossessed objects are displayed in selection of a content to be used in an application, and therefore, a motivation for obtaining an object that can be used in a game or game state and is not possessed by the user can be enhanced. In addition, a plurality of contents are displayed in such a manner that possessed objects can be visually distinguished from unpossessed objects, and at least the display form or display position of each content is varied based on parameters set for a combination with a game or game stage. Therefore, a motivation for obtaining an unpossessed object can be further enhanced.

The plurality of contents may be divided into a plurality of groups based on the parameters set for a combination of the specified game or game stage and each of the plurality of contents, and the groups of contents obtained by the division may be disposed and displayed in respective different areas of the selection image.

With the above configuration, contents usable in a game or game stage are disposed and divided into a plurality of groups based on parameters. Therefore, the selection screen is easier to see, and therefore, a motivation for obtaining a content not possessed by the user can be enhanced.

Of the contents disposed in each area, the possessed contents and the unpossessed contents may be grouped and disposed separately, and the contents may be arranged under a sorting condition in the area.

With the above configuration, contents usable in a game or game stage are grouped and disposed based on whether they are possessed or unpossessed, and are arranged under a predetermined sorting condition. Therefore, the selection screen is further easier to see, and therefore, a motivation for obtaining a content not possessed by the user can be further enhanced.

The plurality of areas may be displayed and arranged on the display screen in a first direction, and the contents may be arranged in each area in a second direction different from the first direction.

With the above configuration, contents usable in a game or game stage are arranged in different directions based on different criteria. Therefore, the result of assessment of contents can be easily understood, and therefore, a motivation for obtaining a content not possessed by the user can be enhanced.

The selection image may be displayed in which the plurality of contents are arranged based on the parameters set for the combination with the specified game or game stage.

With the above configuration, contents usable in a game or game stage are easily understood, and therefore, a motivation for obtaining a content not possessed by the user can be enhanced.

Execution of the game using the unpossessed character may be limited.

With the above configuration, execution of a game using an unpossessed character is limited, and therefore, a motivation for obtaining a content not possessed by the user can be enhanced.

Of the plurality of contents included in the selection image, selection of the unpossessed content may be limited.

With the above configuration, selection of an unpossessed content is limited, and therefore, a motivation for obtaining a content not possessed by the user can be enhanced.

In the above information processing system, the computer may further executes, when a condition for giving the unpossessed content is satisfied, changing the unpossessed content into a state in which the unpossessed content is possessed by the user, by changing the unpossessed content into a possessed content, and storing the possessed content.

With the above configuration, when the giving condition is satisfied, an unpossessed content is changed into a possessed state, and therefore, a motivation for obtaining a content not possessed by the user can be enhanced.

When the unpossessed content is purchased by the user or when the unpossessed content is won by lottery performed by the user, the unpossessed content may be changed into the state in which the unpossessed content is possessed by the user.

With the above configuration, an unpossessed content is given to the user according to the result of lottery, and therefore, a motivation for obtaining a content not possessed by the user, by lottery, can be enhanced.

The computer may further executes displaying a first transition image for receiving the user's instruction to display an acquisition preparation image for performing purchase or lottery for the unpossessed content, and when the user's instruction to display the acquisition preparation image is received, displaying the acquisition preparation image.

With the above configuration, the screen displaying the selection image can be transitioned to the screen displaying the acquisition preparation image, resulting in an improvement in operability when an unpossessed content is obtained.

In a state in which the acquisition preparation image is displayed, a second transition image may be displayed for receiving the user's instruction to display the selection image. When the user's instruction to display the selection image is received, the selection image may be displayed.

With the above configuration, the screen displaying the acquisition preparation image can be transitioned to the screen displaying the selection image, resulting in an improvement in operability after an unpossessed content is obtained.

The game may be executed based on the parameters set for the possessed content used in the specified game or game stage.

With the above configuration, it can be expected that when an unpossessed content is changed into a possessed state, parameters set for the unpossessed content are used in execution of a game. Therefore, the user can give a lot of attention to an unpossessed content not possessed by the user.

The game process may be executed with an advantage or disadvantage in the game or game stage changed based on the parameters set for the combination of the specified game or game stage and the selected content.

With the above configuration, an advantage or disadvantage in a game is determined based on a combination of a game or game stage and a content, resulting in an improvement in amusingness of the game.

The number of items that each content is allowed to possess simultaneously in each game or game stage may be stored as the parameter. A game process including a process of giving as many items as the number of items that the selected content may be allowed to possess in the specified game or game stage.

With the above configuration, the number of items that can be possessed simultaneously by a content is changed according to a combination of a game or game stage and the content, resulting in an improvement in amusingness of the game.

The computer may further execute, when an operation of selecting a content displayed in the selection image is performed, displaying information about the parameters set for a combination of the content and the game or game stage.

With the above configuration, information about parameters set for an unpossessed content can be checked, and therefore, a motivation for obtaining an unpossessed content can be enhanced.

The computer may further execute, when an operation of selecting the unpossessed content displayed in the selection image is performed, displaying an image for prompting the user to obtain the unpossessed content.

With the above configuration, an operation of obtaining an unpossessed character can be more easily understand.

This non-limiting example may be carried out in the form of a storage medium storing an information processing program, an information processing apparatus, and an information processing method.

According to this non-limiting example, not only objects possessed by the user but also unpossessed objects are displayed in selection of a content to be used in an application, and therefore, a motivation for obtaining an object that can be used in a game or game stage and is not possessed by the user can be enhanced. In addition, a plurality of contents are displayed in such a manner that possessed objects can be visually distinguished from unpossessed objects, and at least the display form or display position of each content is varied based on parameters set for a combination with a game or game stage. Therefore, a motivation for obtaining an unpossessed object can be further enhanced.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

Figure 1:
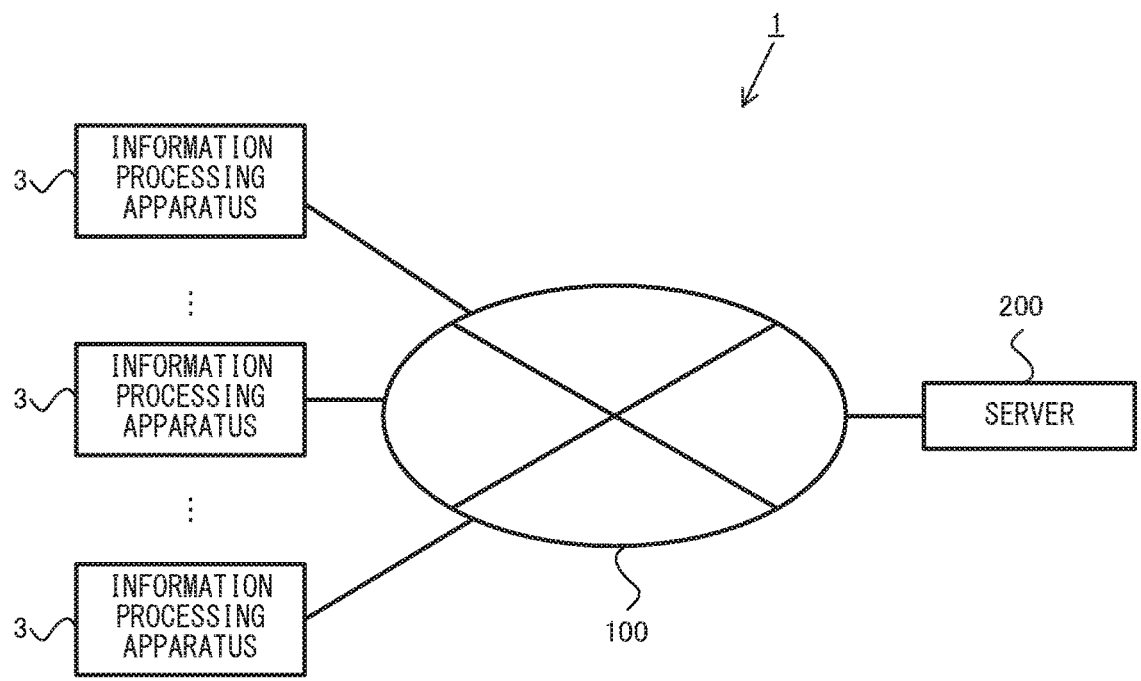
FIG. 1 is a diagram showing a non-limiting example of an information processing system 1 according to this non-limiting example.

An information processing system according to a non-limiting example embodiment will be described with reference to FIG. 1. As shown in FIG. 1, an information processing system 1 that is a non-limiting example of the information processing system of this non-limiting example, includes information processing apparatuses 3 and a server 200, which are connected together through a network 100. Although FIG. 1 shows a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone, handheld game console, personal digital assistant (PDA), etc.

Figure 2:
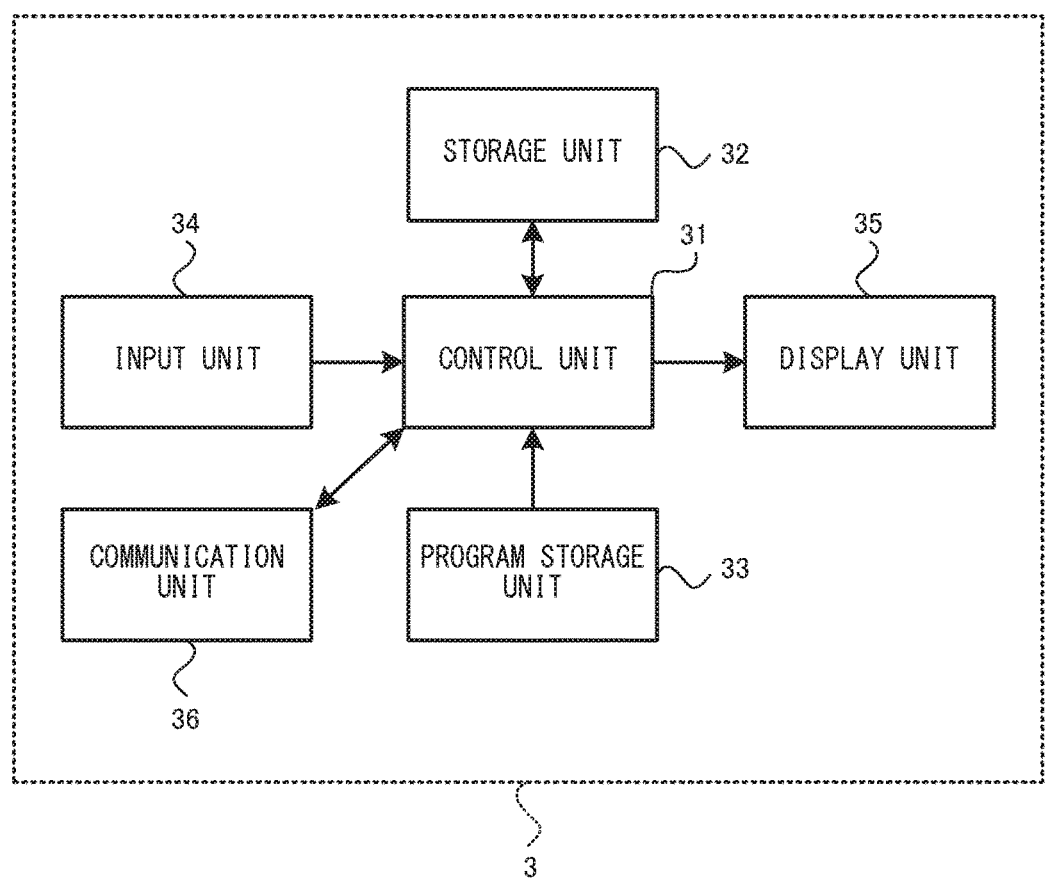
FIG. 2 is a block diagram showing a non-limiting example configuration of an information processing apparatus 3.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device. In a non-limiting example, the input unit 34 may be a touch panel provided on a screen of the display unit 35. For example, the touch panel may be of any type. The touch panel may be either of a type that allows a multi-touch input (e.g., a capacitive type) or of a type that allows a single-touch input (e.g., a resistive type).

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
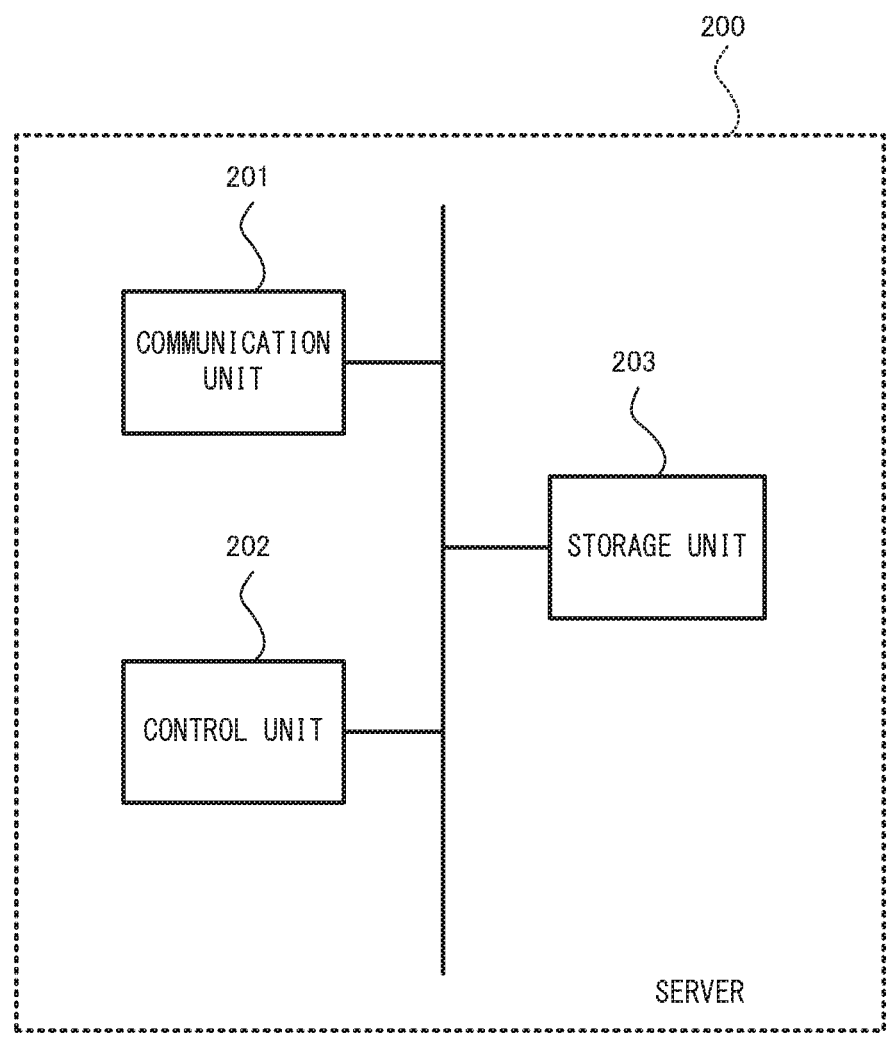
FIG. 3 is a block diagram showing a non-limiting example configuration of a server 200.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. In a non-limiting example, the control unit 202 performs a process of managing the progression of a game performed along with the information processing apparatus 3, a process of managing in-game money (e.g., coins), game items, and game objects (e.g., pieces of equipment used in a game), etc., that are purchased by the user, a process of managing the probability of winning a slot-machine lottery, and a process of managing information about payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
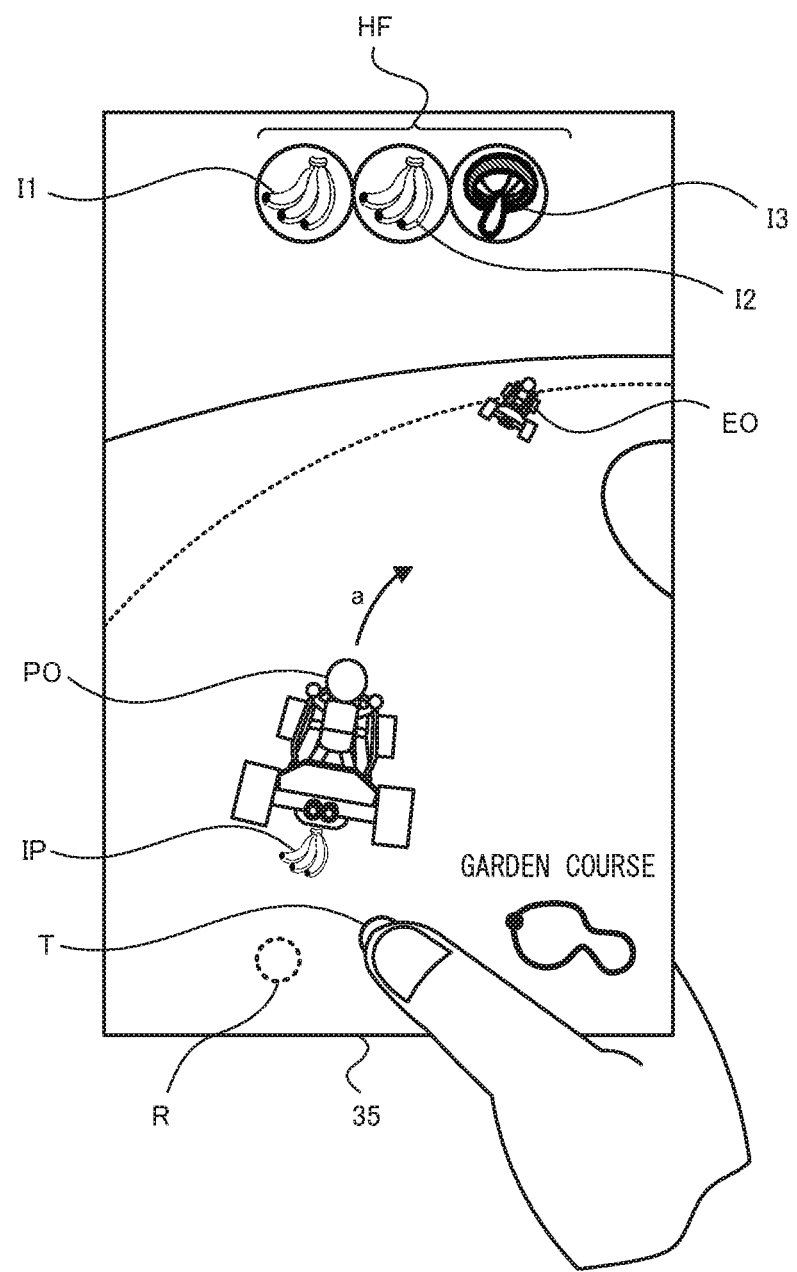
FIG. 4 is a diagram showing a first non-limiting example game image displayed on a display unit 35 of the information processing apparatus 3.
Figure 5:
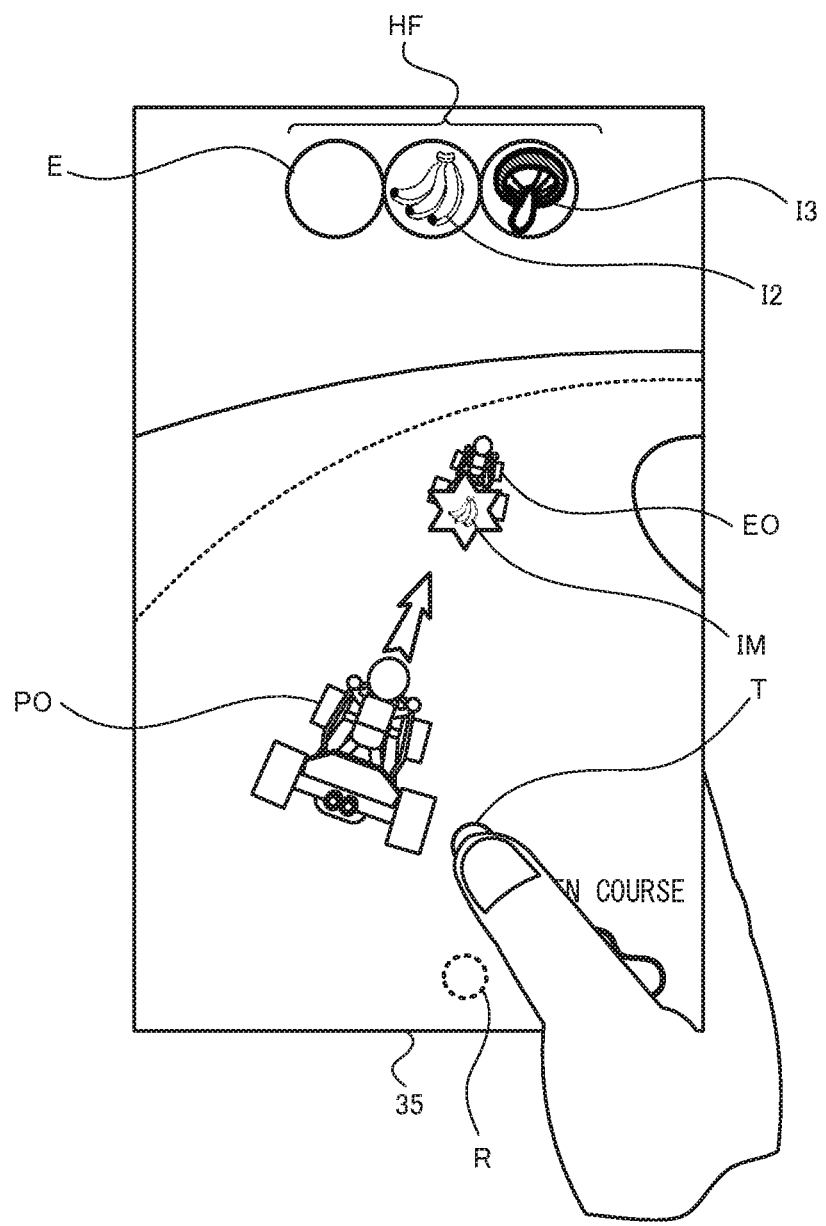
FIG. 5 is a diagram showing a second non-limiting example game image displayed on the display unit 35 of the information processing apparatus 3.
Figure 6:
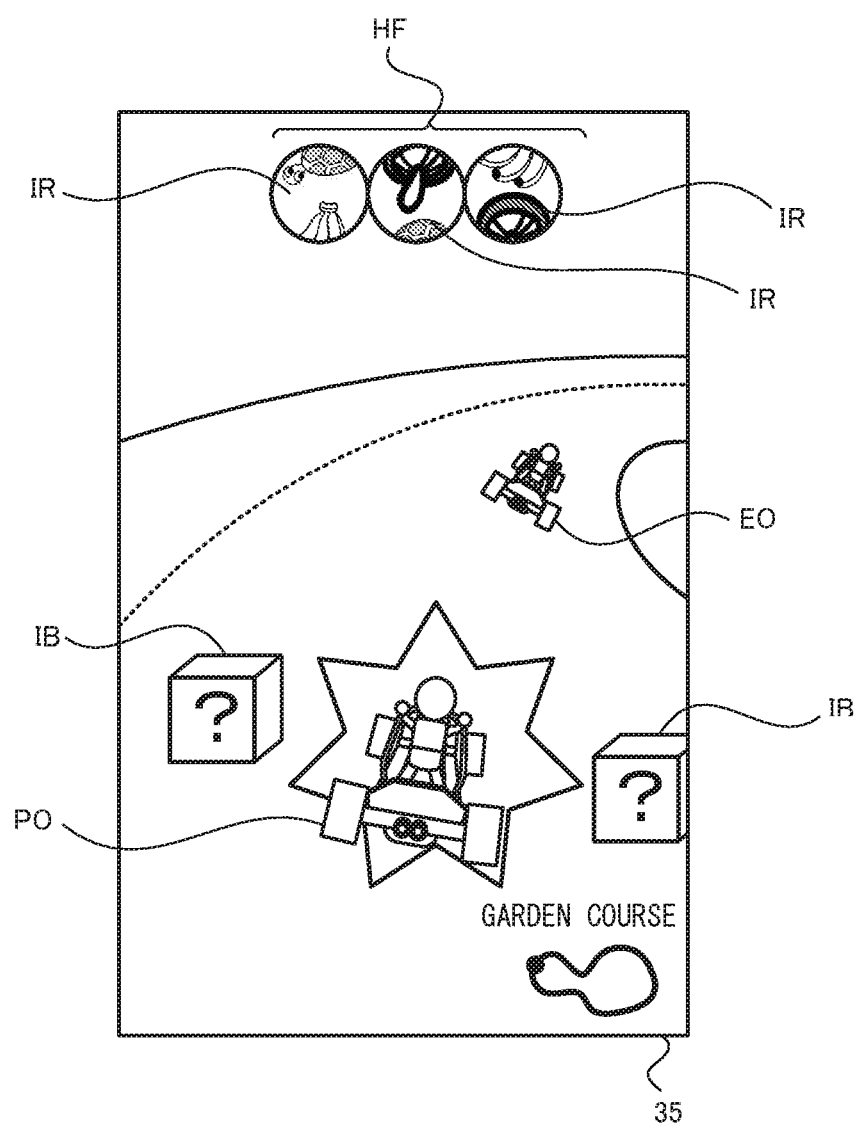
FIG. 6 is a diagram showing a third non-limiting example game image displayed on the display unit 35 of the information processing apparatus 3.
Figure 7:
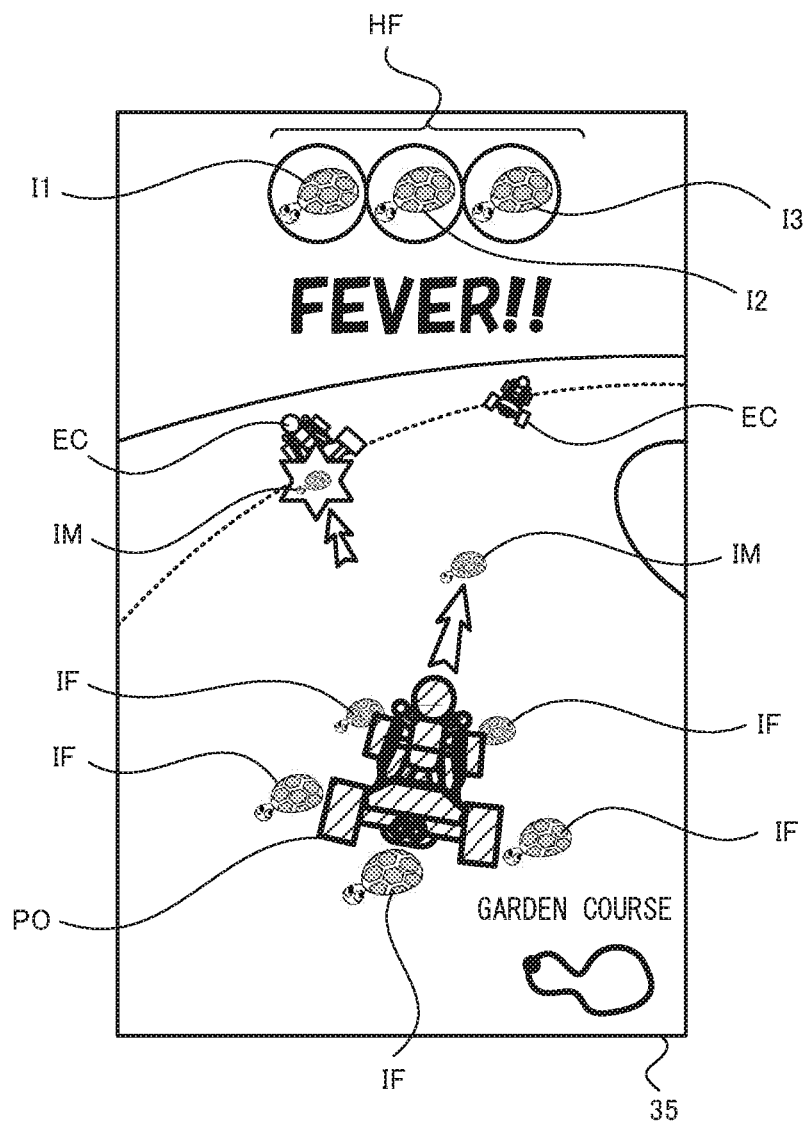
FIG. 7 is a diagram showing a fourth non-limiting example game image displayed on the display unit 35 of the information processing apparatus 3.
Figure 8:
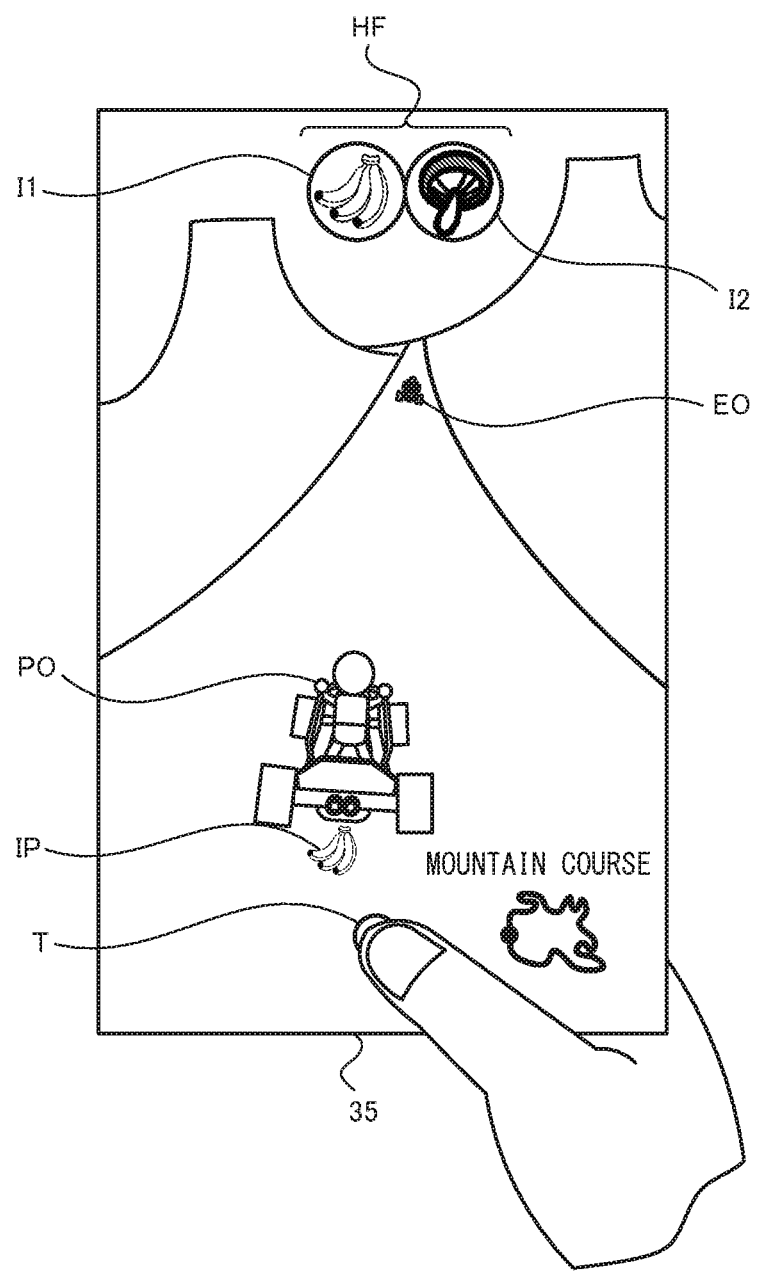
FIG. 8 is a diagram showing a fifth non-limiting example game image displayed on the display unit 35 of the information processing apparatus 3.
Figure 9:
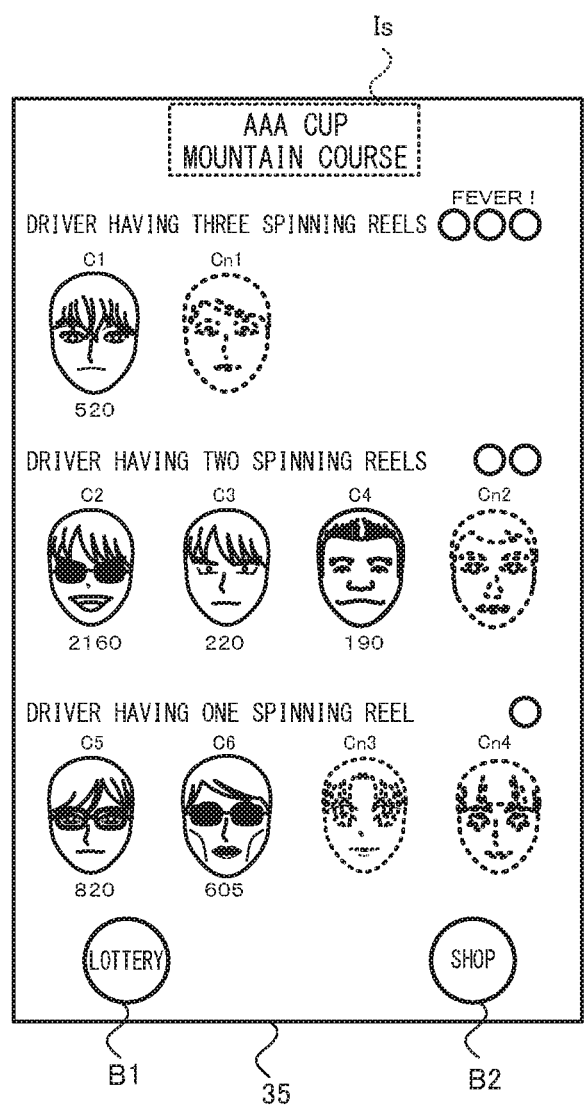
FIG. 9 is a diagram showing a non-limiting example of an operation character selection image displayed on the display unit 35 of the information processing apparatus 3.
Figure 10:
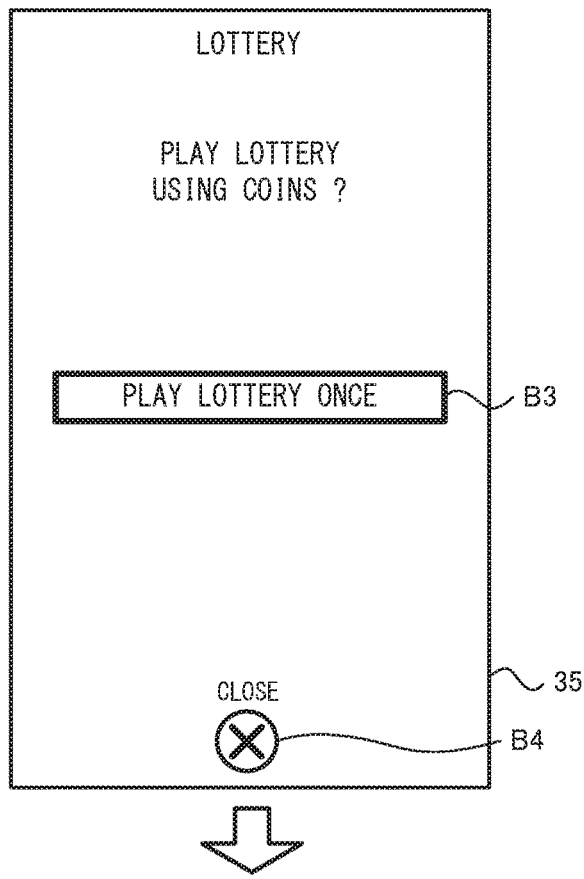
FIG. 10 is a diagram showing a non-limiting example of an image displayed in a lottery process on the display unit 35 of the information processing apparatus 3.
Figure 10:
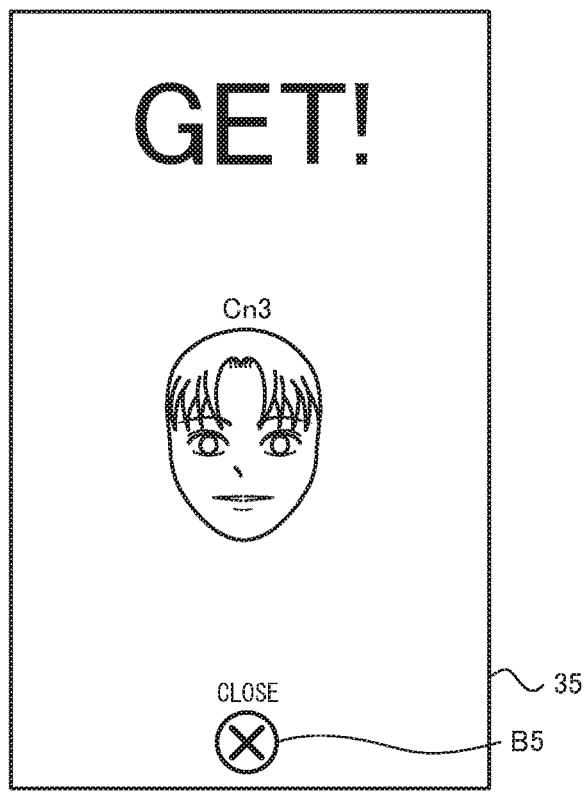
Figure 11:
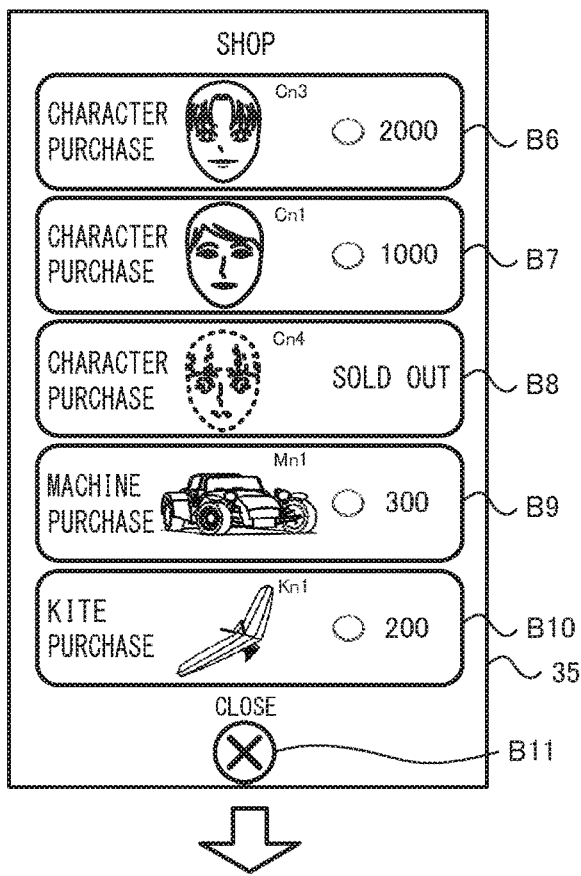
FIG. 11 is a diagram showing a non-limiting example of an image displayed in a purchase process on the display unit 35 of the information processing apparatus 3.
Figure 11:
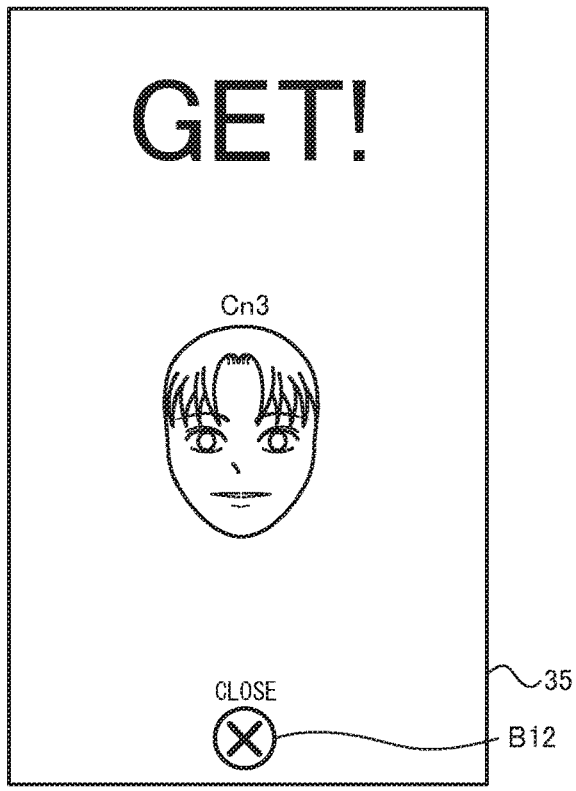
Figure 12:
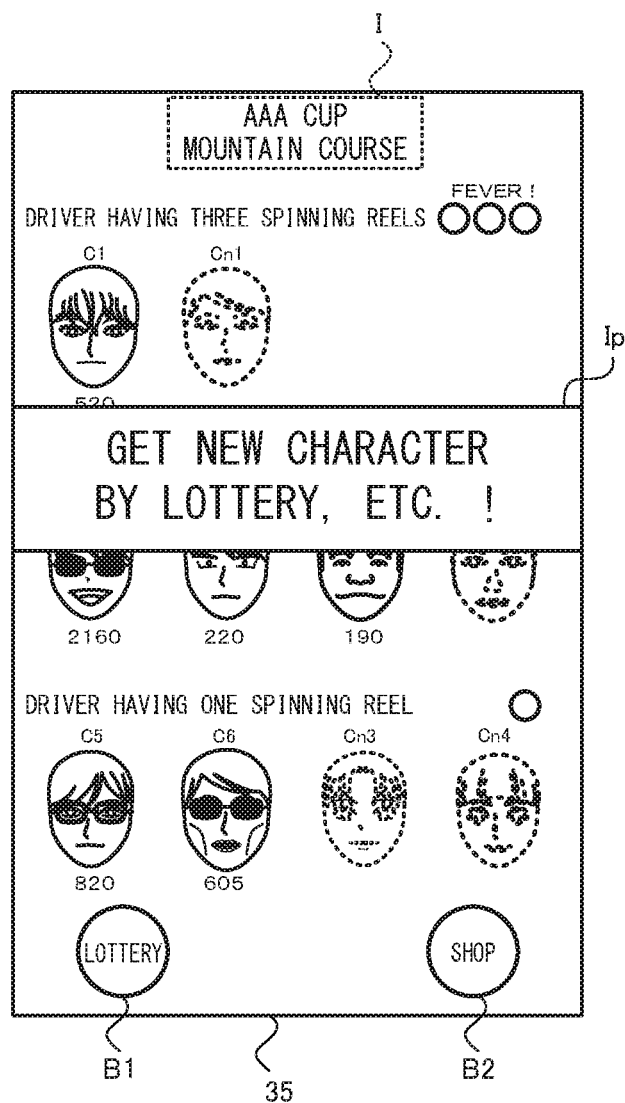
FIG. 12 is a diagram showing a non-limiting example of a lottery/purchase promotion information image displayed on the display unit 35 of the information processing apparatus 3.
Figure 13:
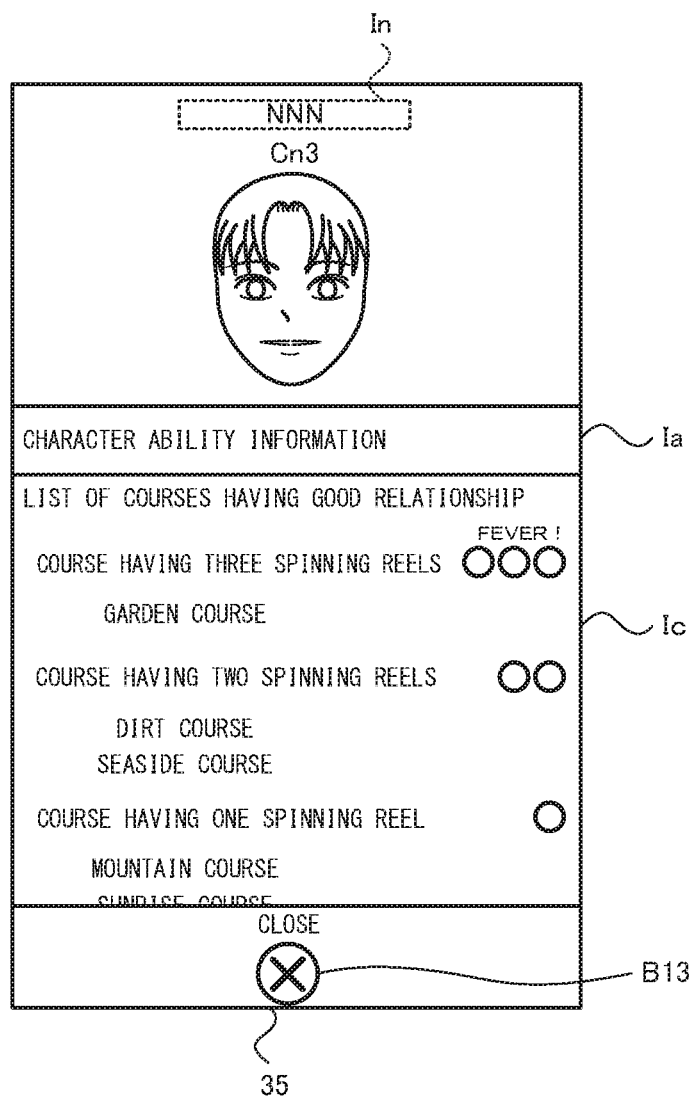
FIG. 13 is a diagram showing a non-limiting example of a character information image displayed on the display unit 35 of the information processing apparatus 3.

Next, before describing specific processes performed by the information processing apparatus 3 and the server 200, a non-limiting example game process performed in the information processing system 1 will be outlined with reference to FIGS. 4-13. Note that FIG. 4 is a diagram showing a first non-limiting example game image displayed on the display unit 35 of the information processing apparatus 3. FIG. 5 is a diagram showing a second non-limiting example game image displayed on the display unit 35 of the information processing apparatus 3. FIG. 6 is a diagram showing a third non-limiting example game image displayed on the display unit 35 of the information processing apparatus 3. FIG. 7 is a diagram showing a fourth non-limiting example game image displayed on the display unit 35 of the information processing apparatus 3. FIG. 8 is a diagram showing a fifth non-limiting example game image displayed on the display unit 35 of the information processing apparatus 3. FIG. 9 is a diagram showing a non-limiting example of an operation character selection image displayed on the display unit 35 of the information processing apparatus 3. FIG. 10 is a diagram showing a non-limiting example of an image displayed in a lottery process on the display unit 35 of the information processing apparatus 3. FIG. 11 is a diagram showing a non-limiting example of an image displayed in a purchase process on the display unit 35 of the information processing apparatus 3. FIG. 12 is a diagram showing a non-limiting example of a lottery/purchase promotion information image displayed on the display unit 35 of the information processing apparatus 3. FIG. 13 is a diagram showing a non-limiting example of a character information image displayed on the display unit 35 of the information processing apparatus 3. Although in the description that follows, a game is used as a non-limiting example application executed in the information processing apparatus 3, other applications may be executed in the information processing apparatus 3.

The display unit 35 of the information processing apparatus 3 displays a game image corresponding to a game played in the information processing apparatus 3. In a non-limiting example of such a game image, FIG. 4 shows a scene in which an operation object PO performs a racing game. For example, in the above game, the operation object PO is such that an operation character object sits on a vehicle object (e.g., a racing machine object or go-kart object equipped with a kite object) and drives the vehicle object on a course provided in a virtual world. Here, as can be seen below, the user is allowed to select a configuration of an operation object PO which is to be operated by the user in a race, before the start of the race. For example, the user is allowed to select a combination of preferred objects from operation character objects, racing machine objects or go-kart objects, and kite objects which are possessed by the user, to configure an operation object PO. On the course, an opponent object(s) EO also sits on and drive another vehicle object. These objects compete to be first to reach a finish provided on the course. A virtual camera for generating a game image is disposed behind the operation object PO traveling on the course, i.e., is moved, following the operation object PO. Note that when the operation object PO deviates from the travel direction of the course due to spinning, drifting, etc., the virtual camera may be still disposed at a position where the operation object PO is seen from behind the operation object PO (i.e., the virtual camera is aimed toward the operation object PO), or may be disposed at a position where the operation object PO is seen from behind along the travel direction of the course (i.e., the virtual camera is aimed in the travel direction of the course). Note that in this non-limiting example, character objects, machine objects, and kite objects are used as non-limiting examples of contents used in a predetermined application.

As shown in FIG. 4, the movement direction of the operation object PO can be controlled by performing an operation of touching the touch panel (a non-limiting example of the input unit 34) provided on the screen of the display unit 35. In a non-limiting example, the operation object PO is controlled to automatically travel forward along the course, and the leftward/rightward movement direction of the operation object PO is controlled by the user's operation (e.g., a steering operation). Specifically, when a touch operation of swiping rightward is performed with reference to the position where the touch panel was first touched (initial touch position), the movement direction of the operation object PO is changed to a rightward direction. When a touch operation of swiping leftward is performed with reference to an initial touch position, the movement direction of the operation object PO is changed to a leftward direction. For example, in FIG. 4, the display unit 35 displays a reference image R showing an initial touch position on the touch panel, and a touch position image T showing a current touch position. Because the touch position image T is located to the right of the reference image R, the movement direction of the operation object PO is changed to a rightward direction (direction "a" in FIG. 4). Note that the operation object PO may not be controlled to automatically travel forward along the course, and may be caused to travel according to the user's acceleration operation. The operation object PO may also be controlled to be automatically steered to turn left and right along the course. For example, when the course curves to the right, the movement direction of the operation object PO may be changed to a rightward direction to some extent even without the user's steering operation, and in this case, when the user performs a rightward steering operation, the movement direction of the operation object PO may be changed to a rightward direction to a further extent. When the racing game ends after the operation object PO has reached a finish or the like, the user of the operation object PO can obtain a game score corresponding to the standing of the operation object PO, the operation object PO's action in a race, etc.

The user of the operation object PO can fire an item I possessed by the operation object PO by performing a touch operation on the touch panel. For example, the display unit 35 is provided with a plurality of possession frames HF each showing an item I possessed by the operation object PO. In the non-limiting example possession frames HF of FIG. 4, three items I1, I2, and I3 can be possessed in the respective possession frames. One of the items I in the possession frames HF possessed by the operation object PO is displayed, as a ready-to-use item IP, at a ready-to-use position behind the go-kart object of the operation object PO. For example, the ready-to-use item IP is one of the items I in the possession frames HF that was acquired earliest. In the non-limiting example of FIG. 4, the item I1 (a bunch of bananas) displayed in the leftmost possession frame HF is displayed as the ready-to-use item IP at the ready-to-use position. Note that the possession frames HF may be disposed in the virtual space or may overlay the display screen.

In FIG. 5, when a touch operation of swiping the touch panel upward is performed, then if the ready-to-use item IP disposed at the ready-to-use position of the operation object PO is fireable, the item IP is fired as a projectile item IM toward the front of the operation object PO. Note that the ready-to-use item IP and the projectile item IM are typically the same object, and alternatively may be different objects. Some types of ready-to-use items IM (e.g., a banana item) disposed at the ready-to-use position may be fired as the projectile item IM toward the back of the operation object PO when a touch operation of swiping the touch panel downward is performed. Note that if the direction in which the ready-to-use item IP disposed at the ready-to-use position of the operation object PO is fired is fixed, the item IP may be fired as the projectile item IM in the fixed firing direction no matter whether a touch operation of swiping the touch panel is performed upward or downward. Some types of ready-to-use items IP disposed at the ready-to-use position may not be fired from the operation object PO and may be used by the operation object PO itself. In this case, when a touch operation of swiping the touch panel upward is performed, the ready-to-use item IP disposed at the ready-to-use position of the operation object PO is used by the operation object PO. In this case, the speed of the operation object PO may be increased, a damaged part may be repaired, or offensive or defensive power may be increased, depending on an item that is used.

When the operation object PO fires the projectile item IM, an effect that is advantageous to the progression of a race performed by the operation object PO can be obtained, depending on the type of the projectile item IM. For example, when the projectile item IM indicating a carapace collides with the opponent object EO, the collision may decelerate or stop, i.e., obstruct, the traveling of the opponent object EO, and may cause damage to the opponent object EO, depending on the extent of the collision. When the projectile item IM indicating a bunch of bananas collides with the opponent object EO, the projectile item IM may affect the opponent object EO such that the opponent object EO slips on a road, so that the traveling of the opponent object EO is decelerated or stopped.

When an item I has been used, the item I is not currently possessed by the operation object PO, and therefore, the ready-to-use item IP displayed at the ready-to-use position is erased, and the item I in the possession frame HF corresponding to the ready-to-use item IP is also erased (in the non-limiting example of FIG. 5, the item I1 displayed in the leftmost possession frame HF). As a result, the possession frame HF that has displayed the item I that was fired as the projectile item IM is changed to an empty frame E in which no item I is displayed.

Next, an item lottery process performed in the information processing system 1 will be outlined. In the item lottery process, if items I (game objects) possessed by the operation object PO satisfy a predetermined combinational condition, an effect relatively advantageous to progression of a game is given to the operation object PO.

As in FIGS. 4 and 5, in FIG. 6, a game image corresponding to a game played in the information processing apparatus 3 is displayed on the display unit 35 of the information processing apparatus 3. In a non-limiting example, FIG. 10 shows a scene that the operation object PO performs a racing game. For example, in the game, the operation object PO is traveling on a course provided in the virtual world, and can acquire a new item I by passing by or through an item box IB placed on the course and thereby opening the item box IB. Note that the operation object PO can acquire a new item I only if there is a possession frame HF that is an empty frame E.

When the operation object PO passes by or through an item box IB and thereby opens the item box IB, a lottery event for acquiring a new item I is performed. For example, a lottery event display (hereinafter referred to a rotation lottery display) that a plurality of types of items I are shuffled and successively displayed in a possession frame HF that is an empty frame E in a drum-spin or flip fashion, and thereafter, any one of the items I is displayed in a stationary state in the possession frame HF, showing that the item I displayed in a stationary state in the possession frame HF is finally acquired in the lottery. For example, FIG. 6 shows a non-limiting example in which in response to the operation object PO passing by or through an item box IB, rotating display items IR indicating that a plurality of types of items I are successively displayed and lottery is being performed are displayed, i.e., the rotation lottery display is being performed, in all the possession frames HF (three frames). Note that the lottery for acquiring an item I is not performed for a possession frame HF in which an item I is already displayed. Specifically, when a possession frame HF that is an empty frame E and a possession frame HF that is displaying an item I coexist, the item lottery is performed only for the empty frame E. When there is no possession frame HF that is an empty frame E, the item lottery is not performed, and therefore, in this situation, the operation object PO cannot acquire a new item I by the item lottery. Note that even when the operation object PO has not yet reached a position where an item box IB is placed, a lottery event for acquiring a new item I may be performed if the specific position where the item box IB is placed and the position of the operation object PO have a predetermined positional relationship. For example, when the operation object PO reaches within a predetermined distance of an item box IB, passes above or below an item box IB, or passes through a ring-shaped item box IB, a lottery event for acquiring a new item I may be performed. Note that an item box IB may be placed at a specific position on the course, or may appear on the course at any suitable position as time passes.

Items I that are displayed in a stationary state in possession frames HF are finally acquired by the operation object PO through lottery. After the acquisition, the items I can be used by the operation object PO one by one in a predetermined order (e.g., the order in which the items I have been acquired). By using an item I, the operation object PO can obtain an effect advantageous to progression of a race.

As shown in FIG. 7, in this non-limiting example, if the same items I are finally displayed in all the possession frames HF in lottery, the user wins a so-called "fever state" and can obtain an effect more advantageous to progression of a race performed by the operation object PO. In a non-limiting example, when the operation object PO is in the "fever state," an item that has caused the "fever state" can be continuously used for a predetermined fever period of time. Note that the fever period may be varied based on equipment or the like used by the operation object PO.

For example, in the non-limiting example of FIG. 7, the item I1 that is a carapace is displayed in a stationary state in the leftmost possession frame HF, the item I2 that is a carapace is displayed in a stationary state in the middle possession frame HF, and the item I3 that is a carapace is displayed in a stationary state in the rightmost possession frame HF, i.e., the same carapace item I is finally displayed in all the possession frames HF in lottery. In this case, the "fever state" caused by carapace items is continued for a predetermined period of time, and an advantageous effect obtained by using a carapace item is given to the operation object PO only during the predetermined fever period. For example, in the "fever state" caused by carapace items, a plurality of carapace items IF are disposed around the operation object PO, indicating the "fever state" caused by carapace items to the user. When the user is performing a certain touch operation on the touch panel, a projectile carapace item IM is continually fired toward the front of the operation object PO at predetermined intervals. Thus, while a single projectile carapace item IM can be fired from the operation object PO when a carapace item I is used in a normal state, multiple projectile carapace items IM can be continually fired from the operation object PO in the "fever state" caused by carapace items. In the "fever state," a projectile carapace item IM is continually fired at predetermined intervals without performing a swipe operation for firing the item. Therefore, an item can be repeatedly used while controlling the movement direction of the operation object PO by a touch operation. Furthermore, while an item I can be used once for each possession frame HF in the normal state, i.e., the same number of items I as the possession frames HF (e.g., three) can be used, an indefinite number of items (i.e., greater than or equal to the number of possession frames HF, e.g., four or more) can be continually used without being limited to the number of possession frames HF during the fever period in which the "fever state" caused by the same three items I is continued. Therefore, the fever state is more advantageous to the user than in the normal state.

Note that the number of possession frames HF is set based on a combination (relationship) of an operation object PO and a course on which the operation object PO competes in a race. Specifically, when an operation object PO competes in a racing game, the number of possession frames HF that can be used in the racing game is set to any of 1-3. In this case, the fever state is allowed to occur only if the number of possession frames HF is maximum, i.e., three, and all the possession frames HF have the same item I. Therefore, in order to establish the fever state, an operation object PO needs to be combined with a specific course (stage) in a racing game (the relationship between the operation object PO and the course is optimum). For example, in the non-limiting example racing game of FIGS. 4-7, an operation object PO is participating in a race employing a garden course for which the relationship with the operation object PO is optimum, and therefore, the number of possession frames HF usable in the racing game is set to three, which is the maximum number. Thus, because the number of possession frames HF displayed is varied depending on the relationship between an operation object PO and a course, the user is motivated to select the type of an operation object PO.

For example, in the non-limiting example racing game of FIG. 8, an operation object PO is participating in a race employing a mountain course that has not an optimum relationship with the operation object PO. Therefore, when the operation object PO participates in a racing game employing a mountain course, the number of possession frames HF that can be used is set to two (the left item I1 and the right item I2). In this case, the fever state does not occur, and therefore, the operation object PO competes in a race in a relatively disadvantageous situation compared to a garden course. In addition, the number of items I that the operation object PO is allowed to possess is also two, and therefore, the number of items that are available until the next item lottery is smaller than in a garden course. That is, the operation object PO also competes in a race in a relatively disadvantageous situation in terms of the number of available items. Thus, the operation object PO has a disadvantageous relationship with a mountain course.

Next, a selection process of selecting a configuration of an operation object PO will be described. The selection process of selecting a configuration of an operation object PO is performed before the start of a race in which the operation object PO is to participate. For example, an operation object PO is configured by combining an operation character object, an operation machine object, and an operation kite object.

For example, as shown in FIG. 9, in the above selection process, a character selection image that prompts the user to select an operation character object which is to be included in an operation object PO which is to participate in a race, is displayed on the display unit 35 of the information processing apparatus 3. The character selection image includes a participation course information image Is indicating a specified course in which the operation character PO is to participate (in the non-limiting example of FIG. 9, an "AAA cup mountain course"), images of a plurality of character objects which are selectable by the user, a lottery process instruction button B1, and a purchase process instruction button B2. Note that concerning a course in which an operation character PO is to participate, the order of courses in which the user plays may be previously determined, or alternatively, after the user has performed a game start operation, the user may select a course(s) (game stage) in which an operation object PO is to participate from a plurality of options. Although in this non-limiting example, a course in which an operation object PO is to participate is used as a non-limiting example of a game stage, other specified game stages or specified games may be used. As a non-limiting example in which a game is specified, one mini-game may be specified from a plurality of mini-games prepared, and the user is prompted to select an operation character object that is to participate in the mini-game. Note that in this non-limiting example, courses on which a racing game is performed are used as a non-limiting example of a plurality of games or game stages in a predetermined application. Note that in this non-limiting example, concerning unpossessed contents, the lottery process instruction button B1 and the purchase process instruction button B2 are used as a non-limiting example of a first transition image for receiving the user's instruction to display an acquisition preparation image for changing an unpossessed content into a possessed state.

The plurality of character object images included in the character selection image include a possessed character object image(s) C and an unpossessed character object image(s) Cn. A possessed character object image C indicates a character object currently possessed by the user. In the non-limiting example of FIG. 9, illustrated are six possessed character object images C1-C6 indicated by a solid line. The user selects one from possessed character objects possessed by the user so that the selected character object can participate in a racing game as an operation character object (e.g., a driver sitting on a vehicle) included in an operation object PO. For example, by performing a touch operation on a position where a possessed character object image C to be selected by the user is displayed, a character object corresponding to the possessed character object image C on which the touch operation has been performed can be selected and set as an operation character object. Note that in this non-limiting example, when the user performs a touch operation on a position where a possessed character object image C to be selected by the user is displayed, detailed information about a character object corresponding to that possessed character object image C may be displayed for a predetermined period of time or until a predetermined operation is performed by the user, and thereafter, the character object may be set as an operation character object. In a non-limiting example, the above detailed information is displayed using a detailed information image described below with reference to FIG. 13.

An unpossessed character object image Cn indicates a character object that is not currently possessed by the user. In the non-limiting example of FIG. 9, illustrated are four unpossessed character object images Cn1-Cn4 indicated by a dashed line. An unpossessed character object not possessed by the user may come to be possessed by the user, by lottery, purchase, or the like described below. An unpossessed character object not possessed by the user cannot be selected by the user as an operation character object which is allowed to participate in a racing game, if it remains unpossessed, i.e., there is a limitation on selection. Although in the non-limiting example of FIG. 9, the possessed character object images C and the unpossessed character object images Cn are distinguished from each other by solid lines and dashed lines, the possessed character object images C and the unpossessed character object images Cn may be displayed in another manner that can distinguish these two kinds of images. For example, the possessed character object images C and the unpossessed character object images Cn may be displayed in a manner that can distinguish these two kinds of images, using colors, labels, frames, concentrations, transparencies, image motions, sizes, silhouette displays, blur displays, or the like.

Note that in the foregoing, a non-limiting example has been described in which there is a limitation on selection of a character object corresponding to an unpossessed character object image Cn if it remains unpossessed (such a character object cannot be selected). This does not allow execution of a racing game using an unpossessed character object. The execution of a racing game may be limited in another manner. For example, while a character object corresponding to an unpossessed character object image Cn may be selectable in the character selection image, an operation object PO including that character object may be forbidden to participate in a racing game. An unpossessed character object not possessed by the user may temporarily come to be possessed, so that the unpossessed character object may be temporarily changed to a possessed character object, and may be selectable as an operation character object only during a period of time that the unpossessed character object is maintained in such a changed state. In a non-limiting example, when the user temporarily borrows or rents an unpossessed character object, the unpossessed character object may be temporarily changed into a state that the character object is possessed by the user. In another non-limiting example, in the case where an unpossessed character object not possessed by the user is possessed by another user who has a predetermined relationship (having a predetermined friendly relationship, playing a game simultaneously, etc.) with the user, the unpossessed character object may be temporarily changed into a state that the character object is possessed by the user.

A plurality of character object images are displayed and divided into a plurality of groups according to relationship with a course in which character objects are to participate. For example, in the non-limiting example of FIG. 9, a plurality of character object images are divided into a plurality of groups according to the number of possession frames HF (the number of spinning reels) set when a character object participates in a course in which the character object is to participate, and areas where the groups are displayed are displayed and aligned in a first direction (e.g., the vertical direction or longitudinal direction of the screen). Specifically, the possessed character object image C1 and the unpossessed character object image Cn1 are displayed in the same display area, as a character object image belonging to the group that has an optimum relationship that three possession frames HF are set when a character object participates in the "AAA cup: mountain course." The possessed character object images C2-C4 and the unpossessed character object image Cn2 are displayed in the same display area, as a character object image belonging to the group that has a non-optimum relationship that two possession frames HF are set when a character object participates in the "AAA cup: mountain course." The possessed character object images C5 and C6 and the unpossessed character object images Cn3 and Cn4 are displayed in the same display area, as a character object image belonging to the group that has a least optimum relationship that a single possession frame HF is set when a character object participates in the "AAA cup: mountain course." Note that in this non-limiting example, the number of possession frames HF (the number of spinning reels) is used as a non-limiting example of parameters set for a combination of each of a plurality of contents and each of a plurality of games or game stages.

Note that as the parameters which are set for a combination of a specified course and a character object and are used for the above division into groups in the character selection image, another kind of parameter may be used instead of the number of possession frames HF (the number of spinning reels). For example, a plurality of character objects may be displayed and divided according to parameter increase rate (e.g., the increase rate of an ability parameter); attribute; type, class, and category; strength; driving ability; type of an item usable in a course; ability to use an item; size; visual field; endurance; stability; personality or character (resilience in the face of adversity, etc.), difficulty of operation, etc., of a character object when participating in a racing game employing a specified course. For example, in the case where the type (attribute, etc.) of a character object is used as the above parameter, a favorite or unfavorite course (a course on which an operation object PO including the character object is likely or unlikely to get a high score) may be set, depending on the type. Alternatively, an indirect influence may be set so as to add a bonus to a game score in a racing game in the case where a character object is of a particular type.

A plurality of character object images are displayed and arranged in a second direction (e.g., the horizontal direction or width direction of the screen) different from the above first direction, under a predetermined sorting condition, in the display area of each group classified based on a relationship with a course on which a character object is to participate. For example, a plurality of character object images are sorted and displayed so that possessed character object images C are ranked at higher positions (e.g., closer to the left edge of the screen) than those of unpossessed character object images Cn, and a character object having a greater experience value in a racing game is ranked at a higher position. Specifically, in the area of the group for which three possession frames HF are set, the possessed character object image C1 having an experience value of 520 is displayed and ranked at the highest position, and the unpossessed character object image Cn1 is displayed and ranked at the lowest position. In the area of the group for which two possession frames HF are set, the possessed character object image C2 having an experience value of 2160 is displayed and ranked at the highest position, the possessed character object image C3 having an experience value of 220 is displayed next to the possessed character object image C2, the possessed character object image C4 having an experience value of 190 is displayed next to the possessed character object image C3, and the unpossessed character object image Cn2 is displayed and ranked at the lowest position. In the area of the group for which one possession frame HF is set, the possessed character object image C5 having an experience value of 820 is displayed and ranked at the highest position, the possessed character object image C6 having an experience value of 605 is displayed next to the possessed character object image C5, and the unpossessed character object images Cn3 and Cn4 are displayed and ranked at lowest positions.

Note that the sorting condition under which a plurality of character object images are arranged and displayed in the display area of each of the groups obtained by the above division may be based on another parameter instead of an experience value possessed by a character object in a racing game. For example, a plurality of character object images may be arranged and displayed in the above display areas in the order based on a character object's ability (driving ability (speed, steering properties, acceleration, deceleration, power, torque, drive environment, etc.), ability to use an item, strength, size, visual field, game level, endurance, fatigue, motivation, recovery, parameter increase rate, stability, resilience in the face of adversity, etc.), difficulty of operation, popularity, rareness, type, attribute, belonging group, frequency of use, order of acquisition, history of use, etc.

The positions of a plurality of character object images may not be sorted in the display area of each of the groups obtained by the above division. For example, even in the case where a plurality of character object images are disposed at any arbitrary positions in the display area of each of the groups obtained by the above division, characteristics of character objects may be expressed by changing the display form of each character object image, e.g., causing the image of a character object that is relatively at an advantage when traveling on a specified course to emit light, act, change its size, be given a label, change its color, have or not have a frame, have a different frame, etc.

The character selection image includes an operation button (the lottery process instruction button B1, the purchase process instruction button B2) for changing an unpossessed character object into a possessed state. In a non-limiting example, when the user performs a touch operation on the position where the lottery process instruction button B1 is displayed, control can transition to a lottery process of allowing the user to obtain a new character object by lottery.

As shown in FIG. 10, when control transitions to the lottery process according to the user's operation, a lottery process image for lottery is displayed. For example, the lottery process image indicates that lottery is performed, and notifies that predetermined resources are consumed (e.g., virtual currency or in-game coins are consumed) in performing lottery ("Do you perform lottery using coins?"). The lottery process image also includes a lottery decision button B3 for receiving the user's operation instruction to perform lottery. The lottery process image also includes an instruction button B4 for closing the lottery process image and returning to the above state in which the character selection image is displayed. When the user performs a touch operation on the position where the lottery decision button B3 is displayed, the lottery process is started. Note that in this non-limiting example, the lottery process image is used as a non-limiting example of the acquisition preparation image for changing an unpossessed content to a possessed state.

In the above lottery process, a character object, a machine object, a kite object, etc., can be randomly obtained with a winning probability preset in the server 200 or the information processing apparatus 3. Note that in the case where the lottery process is performed by lottery control of the server 200, the information processing apparatus 3 may obtain, from the server 200, a notification indicating an object obtained by lottery, by performing a communication process with the server 200, in response to the user's operation performed on the lottery decision button B3. In the above lottery process, the same object that has already been possessed by the user may be obtained by lottery. In that case, the ability of the duplicate object obtained by lottery may be set to a higher level.

When an object is won and decided on in the above lottery process, an image of the object obtained by lottery (in the non-limiting example of FIG. 10, the unpossessed character object image Cn3) is displayed in the lottery process image. For example, when an unpossessed object not possessed by the user (e.g., an unpossessed character object) is won by the above lottery, the object is changed into a possessed state. Thus, the lottery process image for performing the above lottery process serves as an acquisition preparation image for changing an unpossessed object into a possessed state. The lottery process image also includes an instruction button B5 for closing the lottery process image and returning to the above state in which the character selection image is displayed. Thus, the lottery process image includes an operation button (the closing instruction button B4, the closing instruction button B5) for returning from the state in which the lottery process image is displayed directly to the state in which the character selection image is displayed, resulting in a significant improvement in operability. Note that in this non-limiting example, the closing instruction buttons B4 and B5 are used as a non-limiting example of a second transition image for receiving the user's instruction to display a selection image.

In addition, when the user performs a touch operation on the position where the purchase process instruction button B2 is displayed in the character selection image, control can transition to a purchase process of allowing the user to obtain a new character object by purchase.

As shown in FIG. 11, when control transitions to the purchase process according to the user's operation, a purchase process image for performing purchase is displayed. For example, the purchase process image indicates a shop in which the user can purchase various objects, and displays various objects to be purchased by the user. For example, the purchase process image includes, as options to be purchased by the user, a character object image(s), a machine object image(s), and a kite object image(s). Specifically, in the non-limiting example of FIG. 11, displayed are a selection button B6 for selecting an unpossessed character object Cn3 to be purchased, a selection button B7 for selecting an unpossessed character object Cn7 to be purchased, a selection button B8 for selecting an unpossessed character object Cn8 to be purchased, a selection button B9 for selecting an unpossessed machine object Mn1 to be purchased, and a selection button B10 for selecting an unpossessed kite object Kn1. The purchase process image also includes a closing instruction button B11 for returning to the above state in which the character selection image is displayed. Note that in this non-limiting example, the purchase process image is used as a non-limiting example of the acquisition preparation image for changing an unpossessed content into a possessed state.

For example, in the selection buttons B6-B10 for receiving the user's operation of selecting an object to be purchased, an image indicating each object to be purchased is displayed, and a consideration thereof (e.g., in-game coins or virtual currency required for purchase thereof) is also displayed. When the user performs a touch operation on any of the positions where the selection buttons B6-B10 are displayed, an object to be purchased corresponding to the touch operation position comes to be possessed by the user, the user pays in consideration of the object to be purchased. Note that objects to be purchased which are displayed in the purchase process image may include an object which is sold out and cannot be purchased. In that case, an object to be purchased which is sold out cannot be purchased even when a touch operation is performed on the selection button corresponding to that object (e.g., in the non-limiting example of FIG. 11, the purchase button B8).

In the above purchase process, when an object to be purchased is decided on, an image of the purchased object (in the non-limiting example of FIG. 11, the unpossessed character object image Cn3) is displayed in the purchase process image. For example, when an unpossessed object (e.g., an unpossessed character object) not possessed by the user is obtained by the above purchase, the object is changed into a possessed state. Thus, the purchase process image for performing the above purchase process also serves as a state updating image for changing an unpossessed object into a possessed state. A closing instruction button B12 for returning to the above state in which the character selection image is displayed, is displayed in the purchase process image. Thus, the purchase process image includes an operation button (the closing instruction button B11, the closing instruction button B12) for returning from the state in which the purchase process image is displayed directly to the state in which the character selection image is displayed, resulting in a significant improvement in operability. Note that in this non-limiting example, the closing instruction buttons B11 and B12 are used as a non-limiting example of the second transition image for receiving the user's instruction to display a selection image.

Meanwhile, in a non-limiting example, in the object selection image of FIG. 9, when the user's operation of selecting an unpossessed character object image Cn is performed, prompting information for possessing a character object corresponding to the unpossessed character object image Cn may be displayed. For example, as shown in FIG. 12, when an unpossessed character object image Cn is selected, a prompting image Ip (in a non-limiting example of FIG. 12, "Get a new character by lottery, etc.!") for prompting the user to obtain a new character object by the above lottery, the above purchase, or the like, is displayed, overlaying a portion of the object selection image. Note that in this non-limiting example, the prompting image Ip is used as a non-limiting example of an image for prompting the user to obtain an unpossessed character.

In another non-limiting example, in the object selection image of FIG. 9, when the user's operation of selecting an unpossessed character object image Cn is performed, detailed information about a character object corresponding to the selected unpossessed character object image Cn may be displayed. For example, as shown in FIG. 13, when the unpossessed character object image Cn3 is selected, a detailed information image related to a character object corresponding to the unpossessed character object image Cn3 may be displayed. For example, the detailed information image includes a character object's name image In, a character's ability information image Ia related to various abilities of a character object, course run information Ic about a course having a good relationship with a character object, and a closing instruction button B13 for returning to the above state in which the character selection image is displayed. Here, the course run information Ic relates to the number of possession frames HF set for a selected character object based on the combination of the character object and a course. The course run information Ic indicates a course for which three possession frames HF are set, a course for which two possession frames HF are set, and a course for which one possession frame HF is set. Thus, the above detailed information image can provide information about an unpossessed character object before the user comes to possess that character object, and therefore, can provide an incentive for the user to obtain a content that is not possessed by the user. Note that in this non-limiting example, the detailed information image is used as a non-limiting example of an image displaying information about parameters set for a combination of a content displayed on a selection image with each game or game stage when an operation of selecting the content is performed.

Note that when the user's operation of selecting an unpossessed character object image Cn is performed, the above two examples may be performed simultaneously. For example, when the user's operation of selecting an unpossessed character object image Cn is performed, a detailed information image corresponding to the selected unpossessed character object image Cn may be displayed, and at the same time, the prompting image Ip may be displayed, overlaying a portion of the detailed information image.

When a detailed information image related to a character object corresponding to an unpossessed character object image Cn is displayed, the state in which the detailed information image is displayed may be transitioned directly to the screen on which the unpossessed character object can be changed into a possessed state. For example, if a lottery process instruction button for transitioning to the lottery process in which the user can obtain an unpossessed character object by lottery, or a purchase process instruction button for transitioning to the purchase process in which the user can obtain an unpossessed character object by purchase, may be provided in the above detailed information image. In that case, when an operation of activating these instruction buttons is performed, control can transition directly to the screen on which an unpossessed character object can be changed into a possessed state.

After a character object selected using the above object selection image is set as an operation character object included in an operation object PO that is to participate in a race, a process of selecting and setting another object that is to be included in the operation object PO is performed. For example, as another object that is to be included in an operation object PO, a machine object and kite object that constitute a vehicle object on which an operation character object sits and drives are selected and set. Here, a machine object serves as a racing machine, go-kart, or the like that travels on a course in a racing game, and an operation character object sits on and drives a machine object as a driver. A kite object is a piece of equipment that has the function of allowing a machine object on which an operation character object sits on and drives to fly in the air when the machine object is equipped with the kite object. As with character objects, a plurality of machine objects and a plurality of kite objects are presented to the user as options, and objects selected from the options are set as an operation machine object and an operation kite object. The operation character object, operation machine object, and operation kite object thus set in combination constitute an operation object PO, which is allowed to participate in a racing game. Note that in the object selection image in which a plurality of machine objects and a plurality of kite objects are presented to the user as options, an unpossessed object may be displayed, and operation buttons for transitioning to the lottery process and purchase process may be provided, as in the character object selection process. In that case, the above object selection image in which machine objects and/or kite objects are displayed may be displayed in a manner similar to that of the above object selection image for selecting a character object (see FIG. 9). Specifically, in the object selection image for selecting a machine object and/or kite object, machine objects and/or kite objects may be displayed and divided into a plurality of groups according to relationship between a specified course and a machine object and/or kite object (e.g., the number of possession frames HF (the number of spinning reels) set when a character object PO participates in a race).

Note that a character object or machine object to be selected by the user in this non-limiting example may be other contents that can be used in a racing game. Examples of such other contents include weapon objects, cannonball objects, equipment objects, facility objects, consumption materials such as coatings, marks, items, fuels, and foods, special abilities, other inorganic objects, and other organic objects.

The user's operation of selecting an object may not be a touch operation. For example, an object may be selected and set by an operation performed using an operation button or operation key provided on the information processing apparatus 3, an operation performed using voice, an operation performed by changing the motion or orientation of the body of the information processing apparatus 3, etc. An object may be selected by the control unit 31 automatically, instead of based on the user's operation. In a non-limiting example, an object that has the highest ability for a specified course and is possessed by the user may be automatically selected by the control unit 31 after a predetermined period of time has passed since the start of display.

Only a possessed character object image(s) C and an unpossessed character object image(s) Cn that can participate in a specified course (game stage) may be displayed in the object selection image. Alternatively, all images including images of character objects that cannot participate in the course may be displayed. In the latter case, for images of character objects that cannot participate in a specified course, an indication that a character cannot participate or cannot be selected is displayed.

In the foregoing, the lottery process and purchase process are used as a method for changing an unpossessed object not possessed by the user into a possessed state. Other methods may be used to change an unpossessed object into a possessed state. For example, when a predetermined event in which the user can obtain a new object (a regular event, an event after a predetermined race, an event available when the user's play level has reached a predetermined threshold, etc.) occurs, an object obtained in such an event may be changed into the state that the object is possessed by the user.

In the foregoing, when an operation object PO comes into contact with an item box IB disposed on a course in a race, the operation object PO can obtain a temporary effect that is effective in that race by the use of an item I. Alternatively, the temporary effect may be obtained without such a contact with an item box IB. For example, instead of a lottery event for a new item I that is triggered when the operation object PO comes into contact with an item box IB, a lottery event for a new item I may be automatically performed at predetermined intervals.

Next, processes performed in the information processing apparatus 3 will be described in detail. Firstly, main data used in processes performed in the information processing apparatus 3 will be described with reference to FIG. 14. Note that FIG. 14 is a diagram showing non-limiting example main data and programs stored in the storage unit 32 of the information processing apparatus 3.

Figure 14:
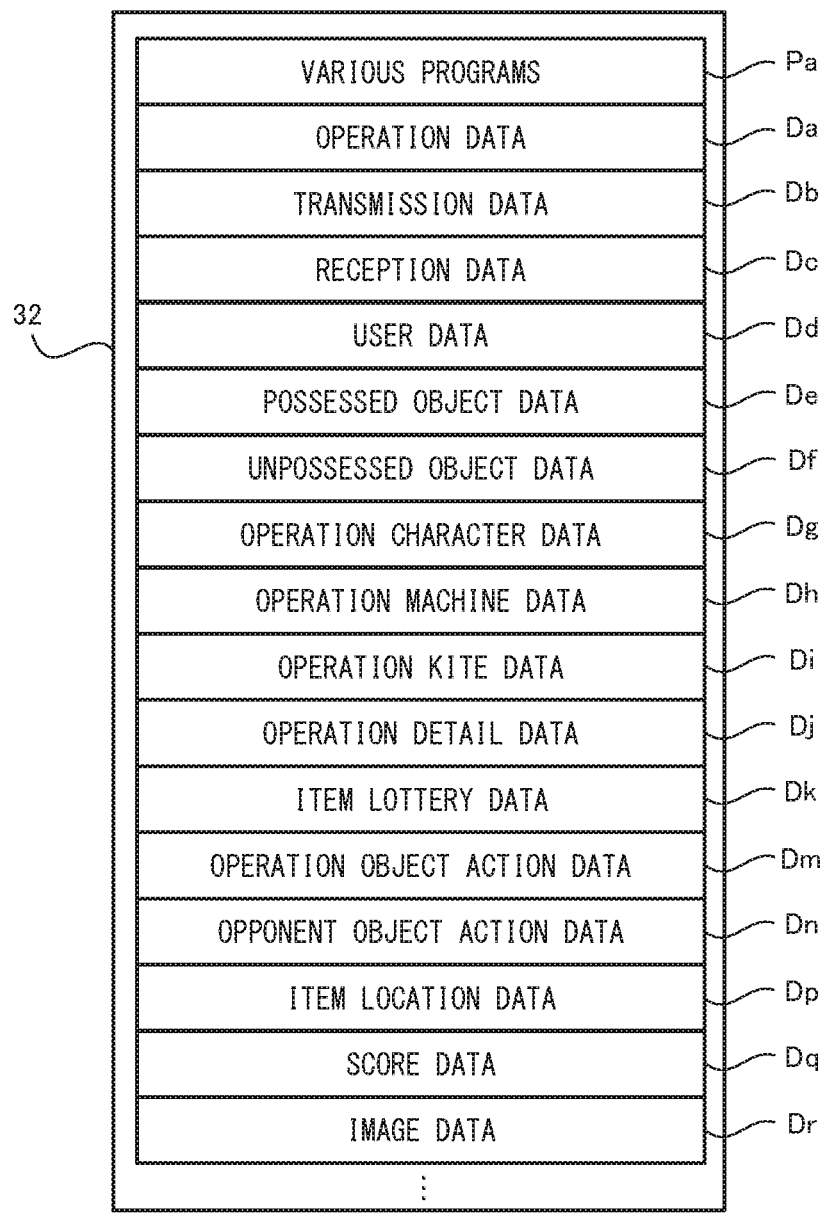
FIG. 14 is a diagram showing non-limiting example main data and programs stored in a storage unit 32 of the information processing apparatus 3.

As shown in FIG. 14, the storage unit 32 stores, in a data storage area, operation data Da, transmission data Db, reception data Dc, user data Dd, possessed object data De, unpossessed object data Df, operation character data Dg, operation machine data Dh, operation kite data Di, operation detail data Dj, item lottery data Dk, operation object action data Dm, opponent object action data Dn, item location data Dp, score data Dq, image data Dr, etc. Note that the storage unit 32 stores, in addition to data contained in the information of FIG. 14, data required in processes such as data used in an executed application. The storage unit 32 also stores, in a program storage region, various programs Pa including a communication program and an information processing program (game program).

The operation data Da indicates operation information about the user's operation on the information processing apparatus 3. For example, operation data indicating an operation performed on the input unit 34 including the touch panel is acquired at time intervals that are a unit process time (e.g., 1/60 sec) of the information processing apparatus 3, and the operation data Da is updated with the acquired operation data.

The transmission data Db is stored as data to be transmitted to the server 200. The reception data Dc has been received from the server 200.

The user data Dd may also include various kinds of data indicating virtual currency, in-game coins, other pieces of equipment, items, a play level, a user ID, etc., possessed by the user. Note that any of the above kinds of data in the user data Dd may be managed by the server 200, and may be transmitted from the server 200 and set before the start of a game.

The possessed object data De includes various kinds of data related to possessed character objects, possessed machine objects, and possessed kite objects that are possessed by the user. For example, the possessed object data De includes data indicating the ability value, relationship with a course (the number of possession frames), experience value, etc., of each character object possessed by the user, data indicating the ability value, experience value, etc., of each machine object possessed by the user, and data indicating the ability value, experience value, etc., of each kite object possessed by the user. Note that any of the above kinds of data in the possessed object data De may be managed by the server 200, and may be transmitted from the server 200 and set before the start of a game.

The unpossessed object data Df includes various kinds of data related to unpossessed character objects, unpossessed machine objects, and unpossessed kite objects not possessed by the user. For example, the unpossessed object data Df includes data indicating the ability value, relationship with a course (the number of possession frames), experience value, etc., of each character object that is not currently possessed by the user and can be obtained by lottery, purchase, or the like, data indicating the ability value, experience value, etc., of each machine object that is not currently possessed by the user and can be obtained by lottery, purchase, or the like, and data indicating the ability value, experience value, etc., of each kite object that is not currently possessed by the user and can be obtained by lottery, purchase, or the like. Any of the above kinds of data in the unpossessed object data Df may be managed by the server 200, and may be transmitted from the server 200 and set before the start of a game.

The operation character data Dg is related to an operation character object that has been selected as a part of an operation object PO from character objects possessed by the user. For example, the operation character data Dg includes data for identifying the selected operation character object, and data indicating a skill, ability value, relationship with a course (the number of possession frames), experience value, etc., set for the operation character object.

The operation machine data Dh is related to an operation machine object that has been selected as a part of an operation object PO from machine objects possessed by the user. For example, the operation machine data Dh includes data for identifying the selected operation machine object, and data indicating a skill, ability value, experience value, etc., set for the operation machine object.

The operation kite data Di is related to an operation kite object that has been selected as a part of an operation object PO from kite objects possessed by the user. For example, the operation kite data Di includes data for identifying the selected operation kite object, and data indicating a skill, ability value, experience value, etc., set for the operation kite object.

The operation detail data Dj indicates the details of an operation that has been performed on the information processing apparatus 3. For example, the operation detail data Dj indicates a steering wheel angle, moving speed, firing direction, etc., calculated from the direction and length of a swipe input performed on the input unit 34 (touch panel).

The item lottery data Dk includes data that is used in a process of performing lottery for an item I that is to be disposed in each possession frame HF, and data indicating the result of the lottery.

The operation object action data Dm indicates an action of an operation object PO, and includes the position, speed, orientation, number of laps, standing, etc., of the operation object PO in a race. The opponent object action data Dn indicates an action of an opponent object EO, and includes the position, speed, orientation, number of laps, standing, etc., of the opponent object EO in a race. The item position data Dp indicates the position of an icon I (ready-to-use item IP) disposed at the ready-to-use position, and the position of a fired icon I (projectile item IM).

The score data Dq indicates a game score that has been obtained in a racing game.

The image data Dr is data for displaying a game image (e.g., an image of an operation object PO, an image of an opponent object EO, an image of an item I, an image of a possession frame HF, an image of another virtual object, a field image of a course, etc., a background image, etc.) on the display unit 35 of the information processing apparatus 3 in the game.

Figure 15:
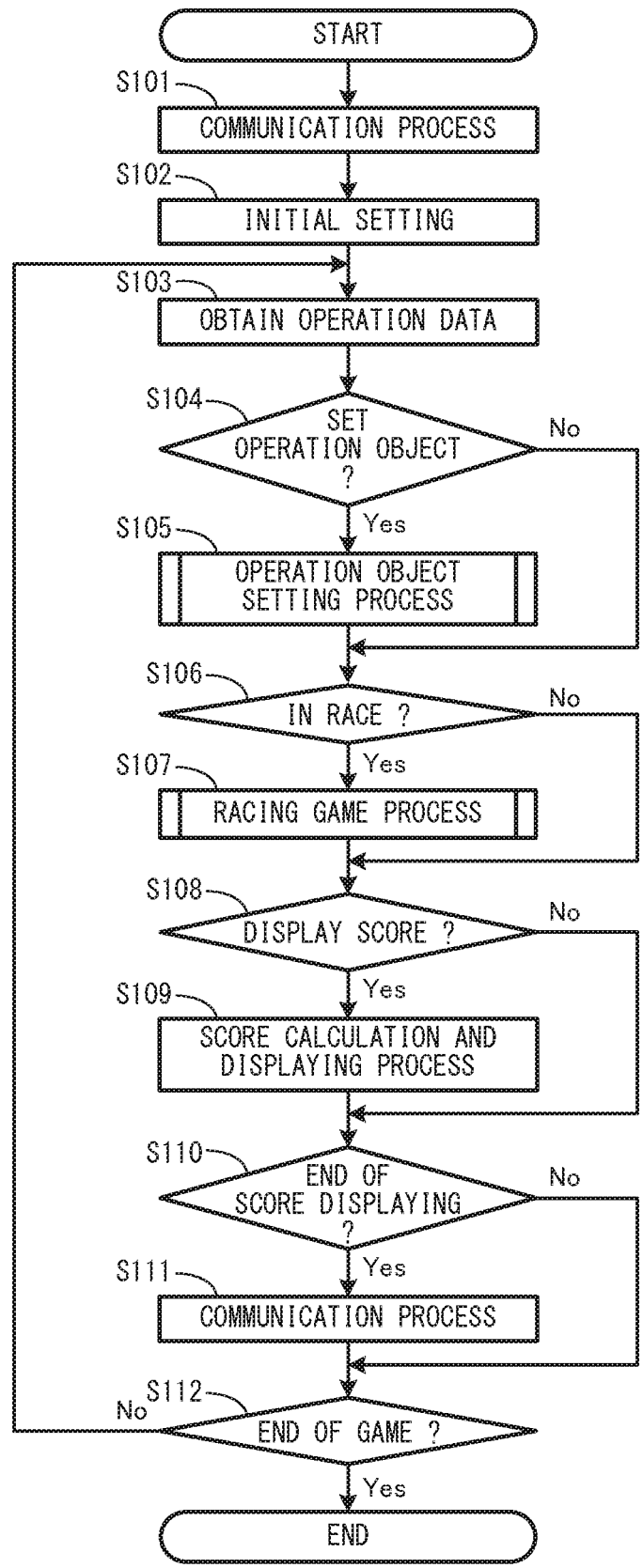
FIG. 15 is a flowchart showing a non-limiting example process executed in the information processing apparatus 3.
Figure 16:
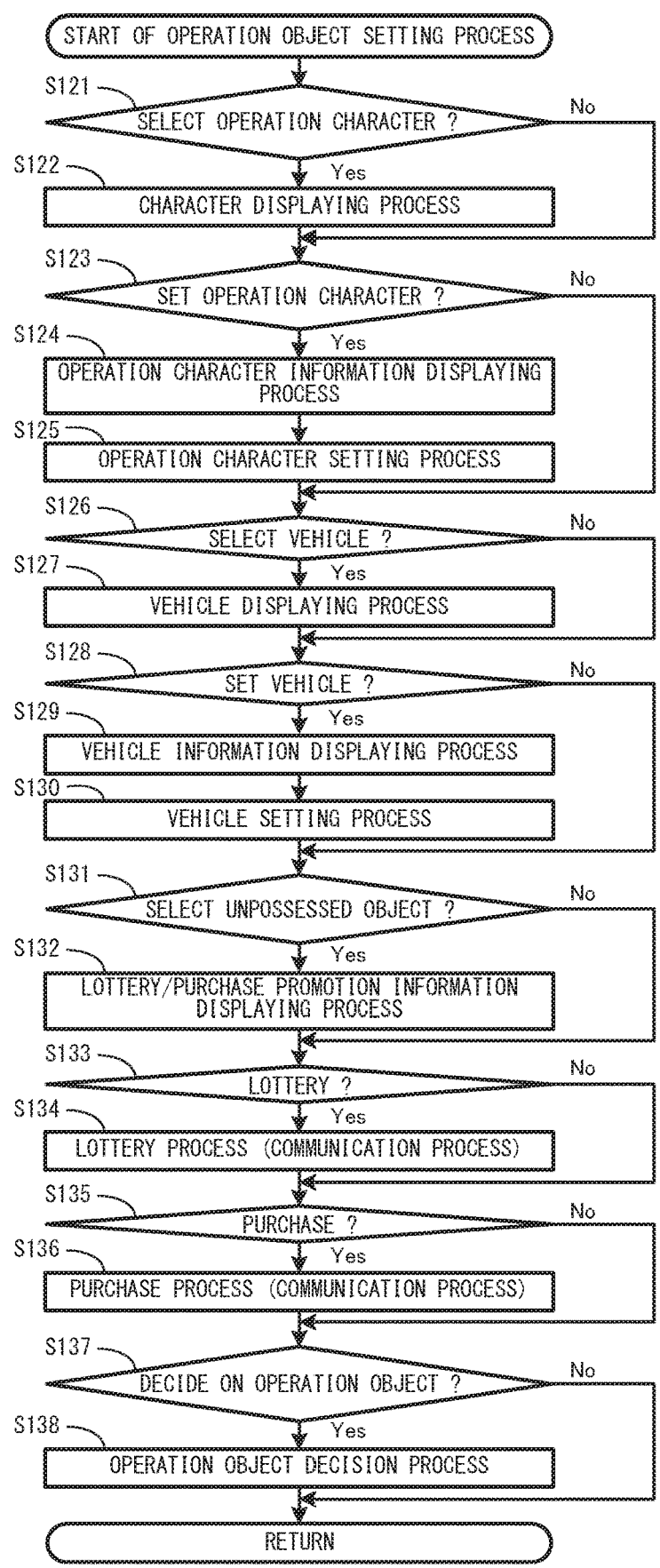
FIG. 16 is a subroutine showing a detailed non-limiting example of an operation object setting process in step S105 of FIG. 15.
Figure 17:
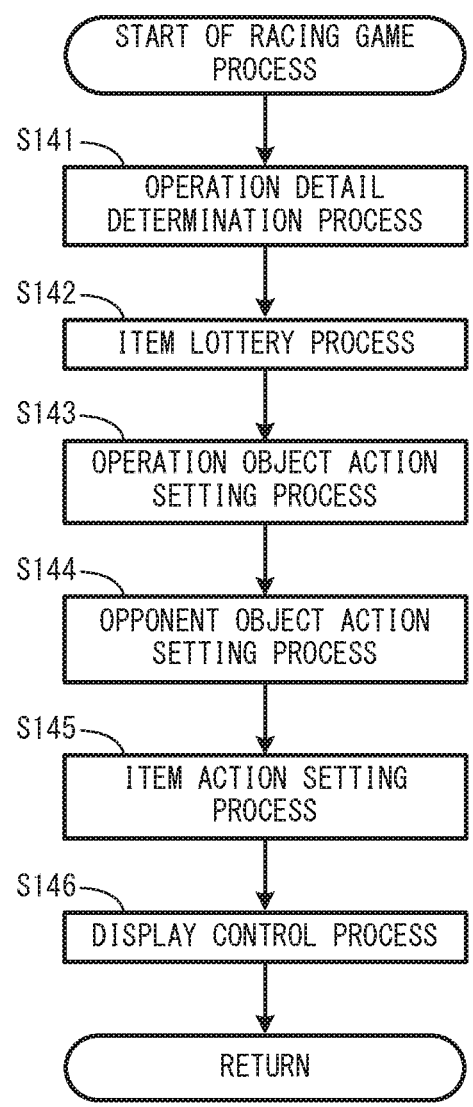
FIG. 17 is a subroutine showing a detailed non-limiting example of a racing game process in step S107 of FIG. 15.

Next, processes performed in the information processing apparatus 3 will be described in detail with reference to FIGS. 15-17. Note that FIG. 15 is a flowchart showing a non-limiting example process executed in the information processing apparatus 3. FIG. 16 is a subroutine showing a detailed non-limiting example of an operation object setting process in step S105 of FIG. 15. FIG. 17 is a subroutine showing a detailed non-limiting example of a racing game process in step S107 of FIG. 15. Here, of the processes of the information processing system 1 in the flowcharts of FIGS. 15-17, game processes involved in processes of setting an operation object PO and performing a racing game based on an operation performed on the operation object PO, will be mainly described as a non-limiting example, and other processes that are not directly involved with these processes will not be described in detail. In FIGS. 15-17, each step executed by the control unit 31 is abbreviated to "S."

In this non-limiting example, steps shown in FIGS. 15-17 are performed by the control unit 31 (CPU) executing a communication program or game program stored in the program storage unit 33. Note that the processes of FIGS. 15-17 are started with any appropriate timing. At this time, all or a portion of the communication program or game program is read from the storage unit 32 with appropriate timing, and is executed by the control unit 31. Thus, the processes of FIGS. 15-17 are started. Note that the communication program and the game program are assumed to be previously stored in the program storage unit 33. In another non-limiting example embodiment, the communication program and the game program may be obtained from a storage medium removably attached to the information processing apparatus 3, and stored in the storage unit 32, or may be obtained from another apparatus through a network, such as the Internet, and stored in the storage unit 32.

The steps of the flowcharts of FIGS. 15-17 are merely illustrative, and if a similar result is obtained, the order in which the steps are performed may be changed, and another step may be executed in addition to or instead of each step. Although, in the non-limiting example embodiment, it is assumed that each step of the flowcharts is executed by the control unit 31, all or a portion of the steps of the flowcharts may be executed by a processor other than the CPU of the control unit 31 or a dedicated circuit.

In FIG. 15, the control unit 31 performs a communication process (step S101), and proceeds to the next step. For example, the control unit 31 transmits transmission data (e.g., data for user authentication (in a non-limiting example, data indicating the user's ID)) stored in the transmission data Db to the server 200 through the network 100. The control unit 31 receives data from the server 200 through the network 100, and updates the reception data Dc using the received data. In a non-limiting example, when a game is played along with another information processing apparatus 3 or in only the information processing apparatus 3 itself, the control unit 31 exchanges data for playing the game with the server 200, as appropriate, in step S101.

Next, the control unit 31 sets initial settings (step S102), and proceeds to the next step. For example, the control unit 31 initially sets parameters for use in the subsequent steps. The control unit 31 also initially sets the user data Dd and the possessed object data De based on contents such as an object and an item that are currently possessed by the user. For example, in step S101, the control unit 31 receives, from the server 200, at least a portion of data possessed by the user (e.g., data related to virtual currency, in-game coins, characters (possessed character objects), vehicles (possessed machine objects and possessed kite objects), items, an experience value, a play level, etc.), data for progression of a racing game to be described below (e.g., lottery table data), etc. Thereafter, the control unit 31 initially sets the user data Dd, the possessed object data De, and the item lottery data Dk based on the data received from the server 200 and the data stored in the information processing apparatus 3. In step S101, the control unit 31 also initially sets, based on reception data received from the server 200 and/or data stored in the information processing apparatus 3, data related to unpossessed objects not currently possessed by the user (unpossessed character objects, unpossessed machine objects, unpossessed kite objects, and information thereabout) into the unpossessed object data Df. The control unit 31 also specifies and sets a course (game stage) in a racing game to be next played by the user. Note that the control unit 31 may specify courses to be played by the user in a predetermined order or according to the user's operation of selecting from a plurality of options.

Next, the control unit 31 acquires operation data from the input unit 34 and updates the operation data Da (step S103), and proceeds to the next step.

Next, the control unit 31 determines whether or not to set an operation object (step S104). For example, if the most recent operation data obtained in step S103 indicates an operation of starting to set an operation object or if an operation object is being set, the result of the determination by the control unit 31 in step S104 is positive. If the control unit 31 determines to set an operation object, the control unit proceeds to step S105. Otherwise, i.e., if the control unit 31 determines not to set an operation object, the control unit proceeds to step S106.

In step S105, the control unit 31 performs an operation object setting process, and proceeds to step S106. The operation object setting process performed in step S105 will now be described with reference to FIG. 16.

In FIG. 16, the control unit 31 determines whether or not to select an operation character (step S121). For example, if the most recent operation data obtained in step S103 indicates an operation of starting to select an operation character or if an operation character is being selected, the result of the determination by the control unit 31 in step S121 is positive. If the control unit 31 determines to select an operation character, the control unit 31 proceeds to step S122. Otherwise, i.e., if the control unit 31 determines not to select an operation character, the control unit 31 proceeds to step S123.

In step S122, the control unit 31 performs a character displaying process, and proceeds to step S123. For example, based on the possessed object data De and the unpossessed object data Df, the control unit 31 generates a character selection image (see FIG. 9) in which possessed character object images C corresponding to possessed character objects possessed by the user and unpossessed character object images Cn corresponding to unpossessed character objects not possessed by the user are divided and sorted according to the ability of each object for a specified course. Thereafter, the control unit 31 performs a display control process of displaying, on the display unit 35, the above character selection image as an image for prompting the user to select an operation character object from a plurality of character objects.

In step S123, the control unit 31 determines whether or not to set an operation character. For example, if the most recent operation data obtained in step S103 indicates an operation of setting an operation character, i.e., a touch operation of selecting any one of the possessed character object images C, the result of the determination by the control unit 31 in step S123 is positive, and the process of selecting an operation character is ended. If the control unit 31 determines to set an operation character, the control unit 31 proceeds to step S124. Otherwise, i.e., if the control unit 31 determines not to set an operation character, the control unit 31 proceeds to step S126.

In step S124, the control unit 31 displays detailed information about the set operation character, and proceeds to the next step. For example, based on the possessed object data De, the control unit 31 performs a display control process of displaying, on the display unit 35, a detailed information image (see FIG. 13) related to a character object corresponding to the possessed character object image C selected by the user, for a predetermined period of time or until a predetermined user's operation is performed. Note that in the case where an operation character object is set without displaying a detailed information image, the control unit 31 may proceed to step S125 without performing step S124.

Next, the control unit 31 performs an operation character setting process of setting an operation character object (S125), and proceeds to step S126. For example, the control unit 31 sets a character object selected according to the operation data obtained in S103, as an operation character object, and updates the operation character data Dg with data related to the operation character object (e.g., data indicating a skill, ability value, relationship with a course (the number of possession frames), experience value, etc.).

In step S126, the control unit 31 determines whether or not to select a vehicle. For example, if the most recent operation data obtained in step S103 indicates an operation of starting to select a vehicle (a machine object and a kite object) or if a vehicle is being selected, the result of the determination by the control unit 31 in step S126 is positive. If the control unit 31 determines to select a vehicle, the control unit 31 proceeds to step S127. Otherwise, i.e., if the control unit 31 determines not to select a vehicle, the control unit 31 proceeds to step S128.

In step S127, the control unit 31 performs a vehicle display process, and proceeds to step S128. For example, based on the possessed object data De and the unpossessed object data Df, the control unit 31 generates a vehicle selection image displaying possessed machine object images corresponding to possessed machine objects possessed by the user, possessed kite object images corresponding to possessed kite objects possessed by the user, unpossessed machine object images corresponding to unpossessed machine objects not possessed by the user, and unpossessed kite object images corresponding to unpossessed kite objects not possessed by the user. Thereafter, the control unit 31 performs a display control process of displaying, on the display unit 35, the above vehicle selection image as an image for prompting the user to select an operation machine object and an operation kite object from a plurality of machine objects and a plurality of kite objects.

In step S128, the control unit 31 determines whether or not to set a vehicle. In a non-limiting example, if the most recent operation data obtained in step S103 indicates an operation of setting a machine, the result of the determination by the control unit 31 in step S128 is positive, and the process of selecting a machine is ended. In another non-limiting example, if the most recent operation data obtained in step S103 indicates an operation of setting a kite, the result of the determination by the control unit 31 in step S128 is positive, and the process of selecting a kite is ended. If the control unit 31 determines to set a vehicle, the control unit 31 proceeds to step S129. Otherwise, i.e., if the control unit 31 determines not to set a vehicle, the control unit 31 proceeds to step S131.

In step S129, the control unit 31 displays detailed information about the set vehicle, and proceeds to the next step. For example, based on the possessed object data De, the control unit 31 performs a display control process of displaying, on the display unit 35, a detailed information image related to a machine object or kite object corresponding to the possessed machine object image or possessed kite object image selected by the user, for a predetermined period of time or until a predetermined user's operation is performed. Note that in the case where an operation machine object and/or operation kite object are set without displaying a detailed information image, the control unit 31 may proceed to step S130 without performing step S129.

Next, the control unit 31 performs a vehicle setting process of setting an operation machine object and/or an operation kite object (step S130), and proceeds to step S131. In a non-limiting example, the control unit 31 sets, as an operation machine object, a machine object selected according to the operation data obtained in step S103, and updates the operation machine data Dh with data related to the operation machine object (e.g., data indicating a skill, ability value, experience value, etc.). In another non-limiting example, the control unit 31 sets, as an operation kite object, a kite object selected according to the operation data obtained in step S103, and updates the operation kite data Di with data related to the operation kite object (e.g., data indicating a skill, ability value, experience value, etc.).

In step S131, the control unit 31 determines whether or not an unpossessed object not possessed by the user has been selected in the above displayed character selection image or vehicle selection image. For example, if the most recent operation data obtained in step S103 indicates an operation of selecting an unpossessed object image corresponding to an unpossessed object, the result of the determination by the control unit 31 in step S131 is positive. If an unpossessed object has been selected, the control unit 31 proceeds to step S132. Otherwise, i.e., if an unpossessed object has not been selected, the control unit 31 proceeds to step S133.

In step S132, the control unit 31 performs a lottery/purchase promotion information display process, and proceeds to step S133. For example, the control unit 31 performs a display control process of displaying, on the display unit 35, the prompting image Ip (see FIG. 12) for prompting the user to obtain a new character object by lottery, purchase, or the like, overlaying the displayed character selection image or vehicle selection image, until a predetermined period of time has passed.

In step S133, the control unit 31 determines whether or not to perform the lottery process. For example, if the most recent operation data obtained in step S103 indicates an operation of transitioning to the lottery process (e.g., an operation of activating the lottery process instruction button B1 (see FIG. 9)) or the lottery process is being performed, the result of the determination by the control unit 31 in step S133 is positive. If the control unit 31 determines to perform the lottery process, the control unit 31 proceeds to step S134. Otherwise, i.e., if the control unit 31 determines not to perform the lottery process, the control unit 31 proceeds to step S135.

In step S134, the control unit 31 performs the lottery process, and proceeds to step S135. For example, the control unit 31 performs a display control process of displaying the lottery process image (see FIG. 10) on the display unit 35, and performs the lottery process of winning a character object, machine object, kite object, etc., at random, based on a preset winning probability, in response to the user's operation of starting lottery. Note that in the above lottery process, the control unit 31 may receive a notification indicating an object to be won, from the server 200, by performing a communication process with the server 200. If an object to be won is decided on, the control unit 31 displays an image of the won object. The control unit 31 also changes data of the won object, and ends the lottery process. In a non-limiting example, if an unpossessed object has been won, the control unit 31 may move data of that object from the unpossessed object data Df to the possessed object data De, and thereby change the object into the state in which the object is possessed by the user, and transmit, to the server 200, data indicating that the object has been changed into the state in which the object is possessed by the user. In another non-limiting example, if the same possessed object that had already been possessed has been won, the control unit 31 updates the possessed object data De corresponding to that duplicate object so that the level of the ability of the duplicate object is increased. Note that if an operation of ending the lottery process (e.g., an operation of activating the closing button B4 or B5 (see FIG. 10)) has been performed in the middle of the lottery process, the control unit 31 changes the displayed image to a process image (e.g., the character selection image or the vehicle selection image) corresponding to the operation, and proceeds to a process step corresponding to the operation.

In step S135, the control unit 31 determines whether or not to perform the purchase process. For example, if the most recent operation data obtained in step S103 is an operation of transitioning to the purchase process (e.g., an operation of activating the purchase process instruction button B2 (see FIG. 9)) or the purchase process is being performed, the result of the determination by the control unit 31 in step S135 is positive. If the control unit 31 determines to perform the purchase process, the control unit 31 proceeds to step S136. Otherwise, i.e., if the control unit 31 determines not to perform the purchase process, the control unit 31 proceeds to step S137.

In step S136, the control unit 31 performs the purchase process, and proceeds to step S137. For example, the control unit 31 performs a display control process of displaying the purchase process image (see FIG. 11) on the display unit 35, and a process of changing a character object, machine object, kite object, or the like to be purchased into the state in which the object is possessed by the user, in response to the user's operation of selecting an object to be purchased. Note that in the above purchase process, the control unit 31 may request the server 200 to perform a consideration management process by performing a communication process with the server 200. If an object to be purchased has been decided on, the control unit 31 displays the purchased object. The control unit 31 changes data of the purchased object, based on the purchased object. In a non-limiting example, if an unpossessed object has been purchased, the control unit 31 moves the data of the object from the unpossessed object data Df to the possessed object data De so that the object is changed into the state in which the object is possessed by the user, and transmits, to the server 200, data indicating that the object has been changed into the state in which the object is possessed by the user. In another non-limiting example, if the same possessed object that had already been possessed has been purchased, the control unit 31 updates the possessed object data De corresponding to that duplicate object so that the level of the ability of the duplicate object is increased. Note that if an operation of ending the purchase process (e.g., an operation of activating the closing button B11 or B12 (see FIG. 11)) has been performed in the middle of the purchase process, the control unit 31 changes the displayed image to the process image (e.g., the character selection image or the vehicle selection image) corresponding to the operation, and proceeds to a process step corresponding to the operation.

In step S137, the control unit 31 determines whether or not to decide on an operation object PO which is to participate in a race, and start the race. In a non-limiting example, if the most recent operation data obtained in step S103 indicates an operation of deciding on an operation object PO and starting a race, the result of the determination by the control unit 31 in step S137 is positive. If the control unit 31 determines to decide on an operation object PO and start a race, the control unit 31 proceeds to step S138. Otherwise, i.e., if the control unit 31 determines not to decide on an operation object PO or start a race, the control unit 31 ends the subroutine.

In step S138, the control unit 31 performs a process of deciding on an operation object PO using the operation character object, operation machine object, and operation kite object set by steps S121-S136, and ends the operation object setting process, and ends the subroutine. For example, the control unit 31 performs a process of deciding on the ability (parameters) of an operation object PO including an operation character object, operation machine object, and operation kite object, and starting a racing game using the operation object PO.

Referring back to FIG. 15, after the control unit 31 determines not to set an operation object in step S104, or after the operation object setting process in step S105, the control unit 31 determines whether or not a racing game is being played (step S106). For example, if the user has performed an operation of starting a racing game, a predetermined start condition for starting a racing game is satisfied, or a racing game is being played after the start of a racing game, the result of the determination by the control unit 31 in step S106 is positive. If a racing game is being played, the control unit 31 proceeds to step S107. Otherwise, i.e., if a racing game is not being played, the control unit 31 proceeds to step S108.

In step S107, the control unit 31 performs a racing game process, and proceeds to step S108. The racing game process performed in step S107 will now be described with reference to FIG. 17.

In FIG. 17, the control unit 31 performs a process of determining details of an operation (step S141), and proceeds to the next step. For example, the control unit 31 obtains a touch location coordinate point on the touch panel based on the operation data obtained in step S103, adds the touch input coordinate point to touch path coordinate points, and calculates a direction of the touch path in a display screen coordinate system. Based on the direction of the touch path, the control unit 31 sets the steering wheel angle of the operation object PO and the firing direction of an item I, as details of an operation, to update the operation detail data Dj. Note that when the operation data obtained in step S103 indicates a tapping operation, the control unit 31 may set details of an operation based on a displayed image on which the tapping operation was performed. When the operation data obtained in step S103 indicates the release of a touch, the control unit 31 may set the absence of an operation as details of the operation.

Next, the control unit 31 performs an item lottery process (step S142), and proceeds to the next step. For example, if the possession frames HF includes an empty frame E, and the operation object PO has passed through an item box IB disposed on a course and thereby has opened the item box IB, the control unit 31 starts an item lottery event process in which the rotation lottery display of a plurality of types of items I in a possession frame(s) HF that is an empty frame E is performed, and thereafter, any one of the items I is displayed in a stationary state in the possession frame HF. Thereafter, the control unit 31 determines whether or not the "fever state" is won, based on a winning probability described in a lottery table. When the lottery is won, an item I (i.e., a single item I appearing in all the possession frames HF) is decided on, and when the lottery is not won, an item I displayed in a stationary state is decided on for each possession frame HF. An image for notifying of the result of the item lottery is generated and displayed on the display unit 35. When the control unit 31 transitions to the fever state, the control unit 31 sets the action of the operation object PO to an action performed in the fever state caused by the item I displayed in a stationary state, during a predetermined fever period.

Next, the control unit 31 performs a process of setting an action of the operation object PO, based on the user's operation (step S143), and proceeds to the next step. For example, the control unit 31 sets the location and orientation of the operation object PO, taking into account the details (e.g., a steering wheel angle) of an operation set in the operation detail data Dj and an influence from another virtual object, etc., and decides on the action, location, orientation, etc., of the operation object PO, taking into account the state of the operation object PO set in the operation object action data Dm, and updates the operation object action data Dm.

Next, the control unit 31 performs a process of setting an action of an opponent object EO (step S144), and proceeds to the next step. In a non-limiting example, in the case where the action of an opponent object EO is controlled by the control unit 31, the control unit 31 causes the opponent object EO to perform an action according to a predetermined algorithm, and updates opponent object data Dn based on the action. In another non-limiting example, in the case where the action of an opponent object EO is controlled by another user, the control unit 31 causes the opponent object EO to perform an action based on the second user's operation in a manner similar to that of the operation object PO, and updates the opponent object data Dn based on the action.

Next, the control unit 31 performs a process of setting an action of an item based on the user's operation (step S145), and proceeds to the next step. For example, if the details of an operation set in the operation detail data Dj indicate firing of an item I (e.g., a firing direction), the control unit 31 performs a process of firing the projectile item IM from the firing platform location of the operation object PO, and moving the projectile item IM fired from the operation object PO based on the firing direction, and updates the item location data Dp based on the location and orientation after the movement. Note that when an operation of firing an item is performed during the fever period, the control unit 31 performs a process of continually using an item that has caused the "fever state." In a non-limiting example, the control unit 31 continually fires the projectile item IM toward a direction in front of the operation object PO at predetermined intervals, according to the user's touch operation, and updates the operation object action data Dm and the item location data Dp, etc.

Next, the control unit 31 performs a display control process of generating and displaying a display image on the display unit 35 (step S146), and ends the subroutine. For example, the control unit 31 performs a process of generating a display image corresponding to the result of the processes in steps S142-S145, based on the item lottery data Dk, the operation object action data Dm, the opponent object data Dn, and the item location data Dp, etc., and displaying the display image on the display unit 35.

Referring back to FIG. 15, after the control unit 31 determines in step S106 that a racing game is not being played, or after the racing game process in step S107, the control unit 31 determines whether or not to display a game score indicating the result of the racing game (step S108). For example, if in a race performed by the racing game process in step S107, the operation object PO has reached a finish or has ended the race before reaching a finish due to retirement or the like, the result of the determination by the control unit 31 in step S108 is positive. If the control unit 31 determines to display a game score, the control unit 31 proceeds to step S109. Otherwise, i.e., if the control unit 31 determines not to display a game score, the control unit 31 proceeds to step S110.

In step S109, the control unit 31 performs a score calculation and displaying process, and proceeds to step S110. For example, the control unit 31 calculates a game score based on the result of the ended race. The control unit 31 sets a reward that is given to the user according to the game score, separately from the game score. The control unit 31 also performs a process of generating an image for notifying the user of the value of the game score (optionally, a detailed breakdown thereof), and displaying the image on the display unit 35. If a reward corresponding to the game score is given to the user, the control unit 31 also performs a process of generating an image for notifying that a reward has been obtained, and displaying the image on the display unit 35.

In step S110, the control unit 31 determines whether or not to end the display of the game score. For example, if the operation data obtained in the score calculation and displaying process of step S109 indicates an operation indicating that the next game scene display is to be performed, or if a predetermined period of time has passed since the start of the score calculation and displaying process, the result of the determination by the control unit 31 in step S110 is positive. If the control unit 31 determines to end the display of the game score, the control unit 31 proceeds to step S111. Otherwise, i.e., if the control unit 31 determines not to end the display of the game score, the control unit 31 proceeds to step S112.

In step S111, the control unit 31 performs a communication process, and proceeds to step S112. For example, the control unit 31 stores data indicating the result of the racing game in the transmission data Db. In a non-limiting example, the control unit 31 stores, in the transmission data Db, data indicating the operation object PO (an operation character object, an operation machine object, and an operation kite object) used in the racing game, data indicating the experience values thereof, data indicating the rate value of the user, data indicating a game score, data indicating the result of the race, such as a position in standings, other data possessed by the user (virtual currency, in-game coins, items, etc.), etc. Thereafter, the control unit 31 transmits transmission data stored in the transmission data Db to the server 200 through the network 100.

In step S112, the control unit 31 determines whether or not to end the game process. A condition under which the game process is ended is, for example, that a condition for ending the game process is satisfied, that an operation for ending the game process has been performed by the user, etc. If the control unit 31 continues the game process, the control unit 31 returns to and repeats step S103. If the control unit 31 determines to end the game process, the control unit 31 ends the process of the flowchart.

Thus, according to the information processing system 1 for performing a game process, not only objects possessed by the user but also unpossessed objects are displayed in selection of a configuration of an operation object, and therefore, a motivation for obtaining an object that can be used in a game and is not possessed by the user can be enhanced. In addition, a plurality of objects are displayed in such a manner that possessed objects can be visually distinguished from unpossessed objects, and at least one of the display form or display position of each object is varied based on a relationship with a course. Therefore, a motivation for obtaining an unpossessed object can be further enhanced.

Note that in the foregoing, a racing game is used as a non-limiting example game. Alternatively, this non-limiting example is applicable to processes of executing other games and other information processes. For example, this non-limiting example is applicable to various processes, such as a process of executing a competitive game in which a user's operation object completes with another object in a sport, fight, or the like, a process of executing a game in which only a user's operation object appears and tries to clear stages, and a process of executing a simulation game or visual novel game.

In the character selection image, at least one of the display form or display position is varied based on a parameter (e.g., the number of possession frames HF (the number of spinning reels)) of a character object set for a specified course. Alternatively, a plurality of courses may be specified. In that case, a plurality of character objects may be divided into groups according to a parameter set for each course, and may be displayed in the character selection image in groups obtained by the division.

Note that the above game process using the information processing system 1 include the communication process between the information processing apparatus 3 and the server 200. Alternatively, the information processing apparatus 3 may perform the game process alone without connecting to the server 200. In particular, a racing game in which the user operates an operation object PO can be executed without through the server 200, and therefore, can be carried out by an internal process of the information processing apparatus 3. In addition, even in a racing game in which a plurality of information processing apparatuses 3 participate, the game process may be carried out by communication between the information processing apparatuses 3 or between the information processing apparatuses 3 and other apparatuses without through the server 200. A portion of the process of performing a racing game according to the user's operation of an operation object PO may be executed by the server 200. As a result, processes in a plurality of information processing apparatuses 3 can be managed by the server 200 in a centralized fashion.

In the game process using the information processing system 1, a game image is displayed on the display unit 35 provided in the information processing apparatus 3 in an embodiment. The game image may be displayed on a display screen of an external display device (i.e., a display device separated from the information processing apparatus 3) coupled through wireless or wired communication to the information processing apparatus 3. In that case, the above external display device may be considered as a constituent element included in the information processing system 1 or a constituent element external to the information processing system 1.

In the foregoing, the information process and the communication process are performed in the information processing apparatus 3. Alternatively, at least a portion of the steps in the processes may be performed in another apparatus. For example, steps in the processes may be executed in cooperation with the server 200 or another apparatus (e.g., another server, another game apparatus, or another mobile terminal) that can communicate with the information processing apparatus 3. Thus, processes similar to the above processes can be performed by the server 200 or another apparatus performing a portion of the steps of the processes. The above processes may be executed by a single processor or a plurality of cooperating processors included in an information processing system including at least one information processing apparatus. In the above non-limiting example embodiment, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example embodiment can be implanted in a so-called cloud computing system form or distributed wide-area and local-area network system forms. For example, in a distributed local-area network system, the above processes can be executed by cooperation between a stationary information processing apparatus (stationary game apparatus) and a mobile information processing apparatus (handheld game apparatus). Note that in these system forms, each of the above steps may be performed by any suitable one of the apparatuses, and this non-limiting example embodiment may be implemented by assigning the steps to the apparatuses in any suitable manner.

The order of steps, setting values, conditions for determination, etc., used in the above information process are merely for illustrative purposes, and other order of steps, setting values, conditions for determination, etc., may be used to implement this non-limiting example embodiment.

The above information processing program may be supplied to the information processing apparatus 3 not only through an external storage medium, such as an external memory, but also through a wired or wireless communication line. The program may be previously stored in a non-volatile storage device in the information processing apparatus 3. Examples of an information storage medium storing the program may include non-volatile memories, and in addition, CD-ROMs, DVDs, optical disk-shaped storage media similar thereto, and flexible disks, hard disks, magneto-optical disks, magnetic tapes, etc. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertain. If there is any inconsistency or conflict, the present specification (including the definitions) shall prevail.

As described above, this non-limiting example is useful for, for example, information processing systems, information processing programs, information processing apparatuses, and information processing methods, etc., for the purpose of enhancing a motivation for a great achievement in a game.

What is claimed is:

1. An information processing system comprising a computer configured to execute operations comprising:
   storing a content possessed by a user, as a possessed content, of contents usable in an application;
   specifying at least one of a plurality of playable gameplay options that are included in the application;
   displaying, on a display screen, a selection image for selecting a content to be used in the specified playable gameplay option from a plurality of contents, the selection image including the plurality of contents;
   storing parameters for a combination of each of the plurality of contents and each one of the plurality of playable gameplay options;
   selecting at least one from the plurality of contents included in the selection image; and
   executing a game process for the specified playable gameplay option using the selected content and the parameters set for a combination of the selected content and the specified playable gameplay option,
   wherein the plurality of contents within the selection image are each displayed so that the possessed content and an unpossessed content not possessed by the user are visually distinguishable,
   wherein at least one of a display form or a display position is varied for each of the plurality of contents within the selection image based on the parameters that are stored for the combination of each respective one of the plurality of contents to the specified playable gameplay option.

2. The information processing system according to claim 1, wherein
   the plurality of contents are divided into a plurality of groups based on the parameters set for a combination of the specified playable gameplay option and each of the plurality of contents, and the groups of contents obtained by the division are disposed and displayed in respective different areas of the selection image.

3. The information processing system according to claim 2, wherein
   of the contents disposed in each area, the possessed contents and the unpossessed contents are grouped and disposed separately, and the contents are arranged under a sorting condition in the area.

4. The information processing system according to claim 2, wherein
the plurality of areas are displayed and arranged on the display screen in a first direction, and the contents are arranged in each area in a second direction different from the first direction.

5. The information processing system according to claim 1, wherein
the selection image is displayed in which the plurality of contents are arranged based on the parameters set for the combination with the specified playable gameplay option.

6. The information processing system according to claim 1, wherein
execution of the specified playable gameplay option using the unpossessed character is limited.

7. The information processing system according to claim 1, wherein
of the plurality of contents included in the selection image, selection of the unpossessed content is limited.

8. The information processing system according to claim 1, wherein
the computer further executes
when a condition for giving the unpossessed content is satisfied, changing the unpossessed content into a state in which the unpossessed content is possessed by the user, by changing the unpossessed content into a possessed content, and storing the possessed content.

9. The information processing system according to claim 8, wherein
when the unpossessed content is purchased by the user or when the unpossessed content is won by lottery performed by the user, the unpossessed content is changed into the state in which the unpossessed content is possessed by the user.

10. The information processing system according to claim 8, wherein the computer further executes displaying a first transition image for receiving the user's instruction to display an acquisition preparation image for performing purchase or lottery for the unpossessed content, and
when the user's instruction to display the acquisition preparation image is received, displaying the acquisition preparation image.

11. The information processing system according to claim 10, wherein
in a state in which the acquisition preparation image is displayed, a second transition image is displayed for receiving the user's instruction to display the selection image, and
when the user's instruction to display the selection image is received, the selection image is displayed.

12. The information processing system according to claim 1, wherein
the game is executed based on the parameters set for the possessed content used in the specified playable gameplay option.

13. The information processing system according to claim 12, wherein
the game process is executed by controlling an advantage or disadvantage in the specified playable gameplay option based on the parameters set for the combination of the specified playable gameplay option and the selected content.

14. The information processing system according to claim 1, wherein
the number of items that each content is allowed to possess simultaneously in each playable gameplay option is stored as the parameter, and
a game process including a process of giving as many items as the number of items that the selected content is allowed to possess in the specified playable gameplay option.

15. The information processing system according to claim 1, wherein
the computer further executes
when an operation of selecting a content displayed in the selection image is performed, displaying information about the parameters set for a combination of the content and the playable option.

16. The information processing system according to claim 1, wherein
the computer further executes
when an operation of selecting the unpossessed content displayed in the selection image is performed, displaying an image for prompting the user to obtain the unpossessed content.

17. The information processing system of claim 1, wherein the plurality of playable gameplay options includes a plurality of playable games or mini-games and the specified playable gameplay option is a specified game or mini-game from among the plurality of playable games or mini-games that are in the application.

18. The information processing system of claim 1, wherein the plurality of playable gameplay options includes a plurality of playable game stages and the specified playable gameplay option is a specified game stage from among the plurality of playable game stages that are in the application.

19. A non-transitory computer-readable storage medium having stored therein an information processing program executed by a computer included in an apparatus for performing a game process, wherein
the information processing program causes the computer to execute:
storing a content possessed by a user, as a possessed content, of contents usable in an application;
specifying at least one of a plurality of playable gameplay features included in the application;
displaying, on a display screen, a selection image for selecting a content to be used in the specified playable gameplay feature from a plurality of contents, the selection image including the plurality of contents;
storing parameters for a combination of each of the plurality of contents and each of the plurality of playable gameplay features;
selecting at least one from the plurality of contents included in the selection image; and
executing a game process for the specified playable gameplay feature using the selected content and the parameters set for a combination of the selected content and the specified playable gameplay feature,
wherein the plurality of contents are within the selection image each displayed so that the possessed content and an unpossessed content not possessed by the user are visually distinguishable,
wherein and at least one of a display form or a display position is varied for each of the plurality of contents within the selection image based on the parameters that are stored for the combination of each respective one of the plurality of contents to the specified playable gameplay feature.

20. An information processing apparatus comprising a computer that executes:
   storing a content possessed by a user, as a possessed content, of contents usable in an application;
   specifying at least one of a plurality of playable gameplay features included in the application;
   displaying, on a display screen, a selection image for selecting a content to be used in the specified playable gameplay feature from a plurality of contents, the selection image including the plurality of contents;
   storing parameters for a combination of each of the plurality of contents and each of the plurality of playable gameplay features;
   selecting at least one from the plurality of contents included in the selection image; and
   executing a game process for the specified playable gameplay feature using the selected content and the parameters set for a combination of the selected content and the specified playable gameplay feature,
   wherein the plurality of contents within the selection image are each displayed so that the possessed content and an unpossessed content not possessed by the user are visually distinguishable,
   wherein at least one of a display form or a display position is varied for each of the plurality of contents within the selection image based on the parameters that are stored for the combination of each respective on of the plurality of contents to the specified playable gameplay feature.

21. An information processing method comprising:
   storing a content possessed by a user, as a possessed content, of contents usable in an application;
   specifying at least one of a plurality of playable gameplay options included in the application;
   displaying, on a display screen, a selection image for selecting a content to be used in the specified playable gameplay option from a plurality of contents, the selection image including the plurality of contents;
   storing parameters for a combination of each of the plurality of contents and each of the plurality of playable gameplay options;
   selecting at least one from the plurality of contents included in the selection image; and
   executing a game process for the specified playable gameplay option using the selected content and the parameters set for a combination of the selected content and the specified playable gameplay option,
   wherein the plurality of contents are each displayed within the selection image so that the possessed content and an unpossessed content not possessed by the user are visually distinguishable,
   wherein at least one of a display form or a display position is varied for each of the plurality of contents within the selection image based on the parameters that are stored for the combination of each respective one of the plurality of contents to the specified playable gameplay option.

* * * * *